United States Patent
Bridges et al.

(10) Patent No.: US 6,964,113 B2
(45) Date of Patent: Nov. 15, 2005

(54) SCALE-BAR ARTIFACT AND METHODS OF USE

(75) Inventors: Robert E. Bridges, Kennett Square, PA (US); James K. West, Landenberg, PA (US); Peter G. Cramer, Kennett Square, PA (US)

(73) Assignee: Faro Laser Trackers, LLC, Lake Mary, FL (US)

( * ) Notice: Subject to any disclaimer, the term of this patent is extended or adjusted under 35 U.S.C. 154(b) by 0 days.

(21) Appl. No.: 10/093,319

(22) Filed: Mar. 6, 2002

(65) Prior Publication Data

US 2002/0148133 A1 Oct. 17, 2002

Related U.S. Application Data

(60) Provisional application No. 60/273,339, filed on Mar. 6, 2001.

(51) Int. Cl.$^7$ .................................................. B26D 7/28
(52) U.S. Cl. .......................................... 33/702; 33/502
(58) Field of Search ........................... 33/702, 293, 502, 33/536, DIG. 1; 356/634, 620

(56) References Cited

U.S. PATENT DOCUMENTS

| | | | | |
|---|---|---|---|---|
| 2,417,150 A | * | 3/1947 | Berry | 33/536 |
| 4,509,269 A | * | 4/1985 | Leitz | 33/293 |
| 4,523,450 A | * | 6/1985 | Herzog | 33/502 |
| 5,269,067 A | * | 12/1993 | Waeldele et al. | 33/502 |
| 5,514,952 A | * | 5/1996 | Parkinson | 33/661 |
| 5,861,956 A | * | 1/1999 | Bridges et al. | 33/293 |
| 5,907,278 A | * | 5/1999 | Park et al. | 33/366.19 |
| 5,957,717 A | * | 9/1999 | Monsef et al. | 33/293 |
| 6,209,210 B1 | * | 4/2001 | Stout | 33/293 |
| 6,347,457 B1 | * | 2/2002 | Espinoza et al. | 33/288 |
| 6,443,000 B1 | * | 9/2002 | Pugh et al. | 33/702 |
| 6,487,781 B2 | * | 12/2002 | Johnson | 33/293 |
| 6,502,321 B1 | * | 1/2003 | Crain et al. | 33/293 |
| 6,519,860 B1 | * | 2/2003 | Bieg et al. | 33/502 |

* cited by examiner

*Primary Examiner*—Diego Gutierrez
*Assistant Examiner*—Madeline Gonzalez
(74) *Attorney, Agent, or Firm*—Cantor Colburn LLP

(57) ABSTRACT

A scale-bar artifact is and measurement method is provided, the artifact comprising a shaft, at least one mounting nest positioned on the shaft, a plurality of target nests positioned on the shaft, at least one temperature sensor in contact with the material of the shaft and a computer or circuit board in communication with the at least one temperature sensor, wherein the computer or circuit board is configured to receive temperature sensor data and to compile temperature corrected distance measurements corresponding to at least one linear portion of the shaft. Additionally, a scale-bar artifact is provided, comprising a shaft, a plurality of target nests positioned on the shaft and at least one mounting nest positioned on the shaft, wherein the at least one mounting nest comprises either at least one adjustable kinematic mounting nest or at least one fixed kinematic mounting nest configured to receive a separate mounting component. Methods for measuring temperature compensation values of a scale-bar and for accurately measuring scale-bar length with a tracker interferometer are also described.

67 Claims, 18 Drawing Sheets

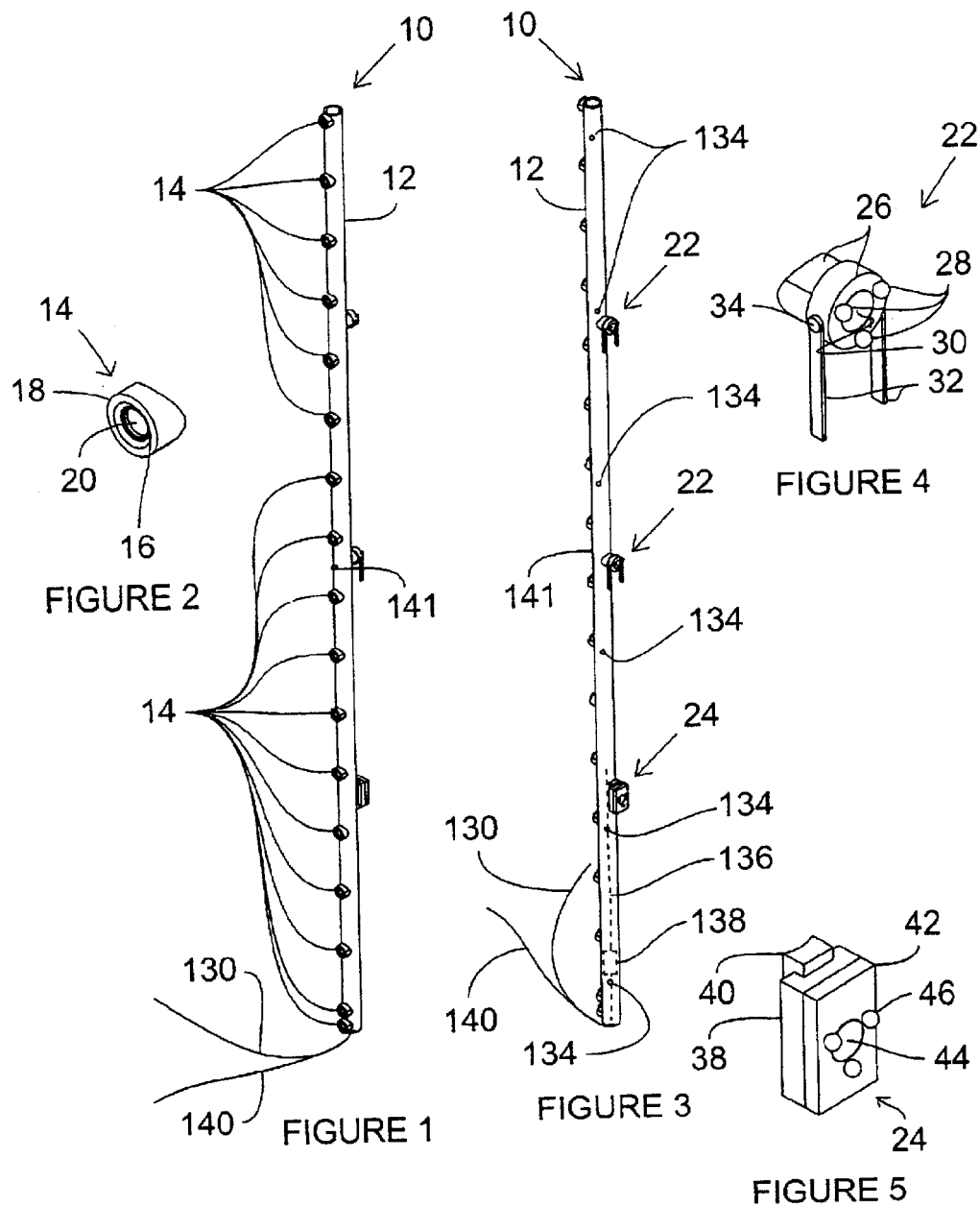

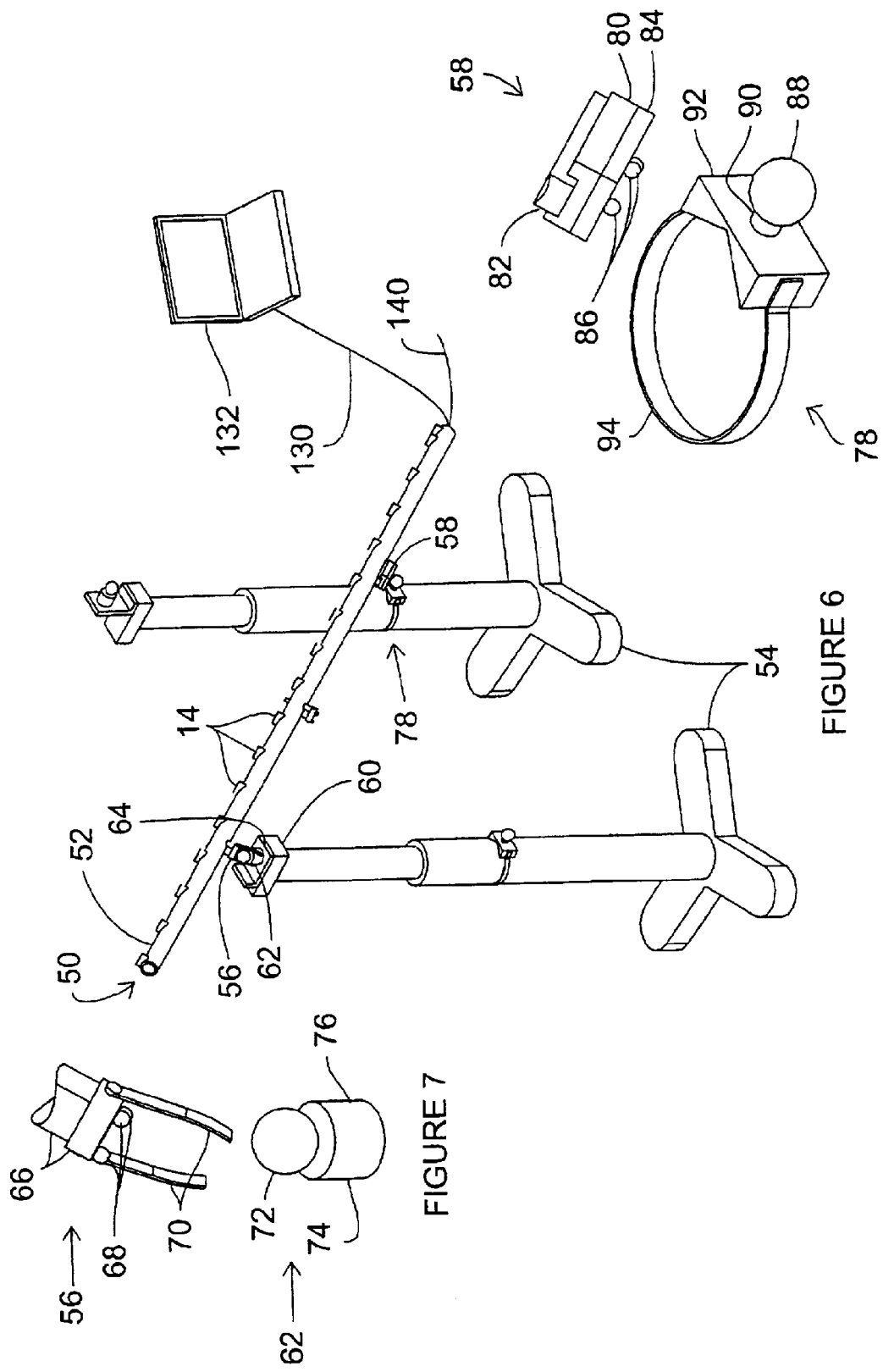

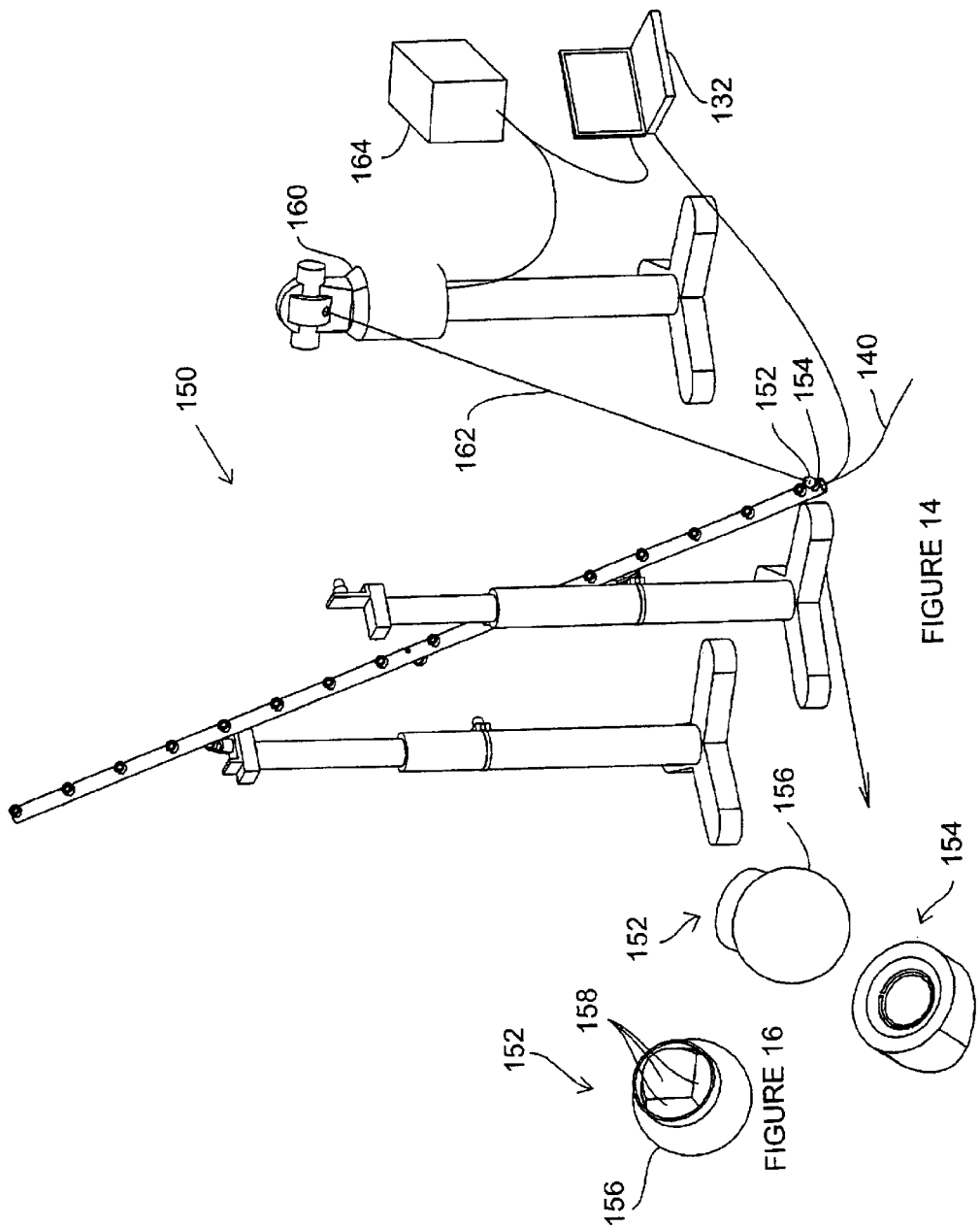

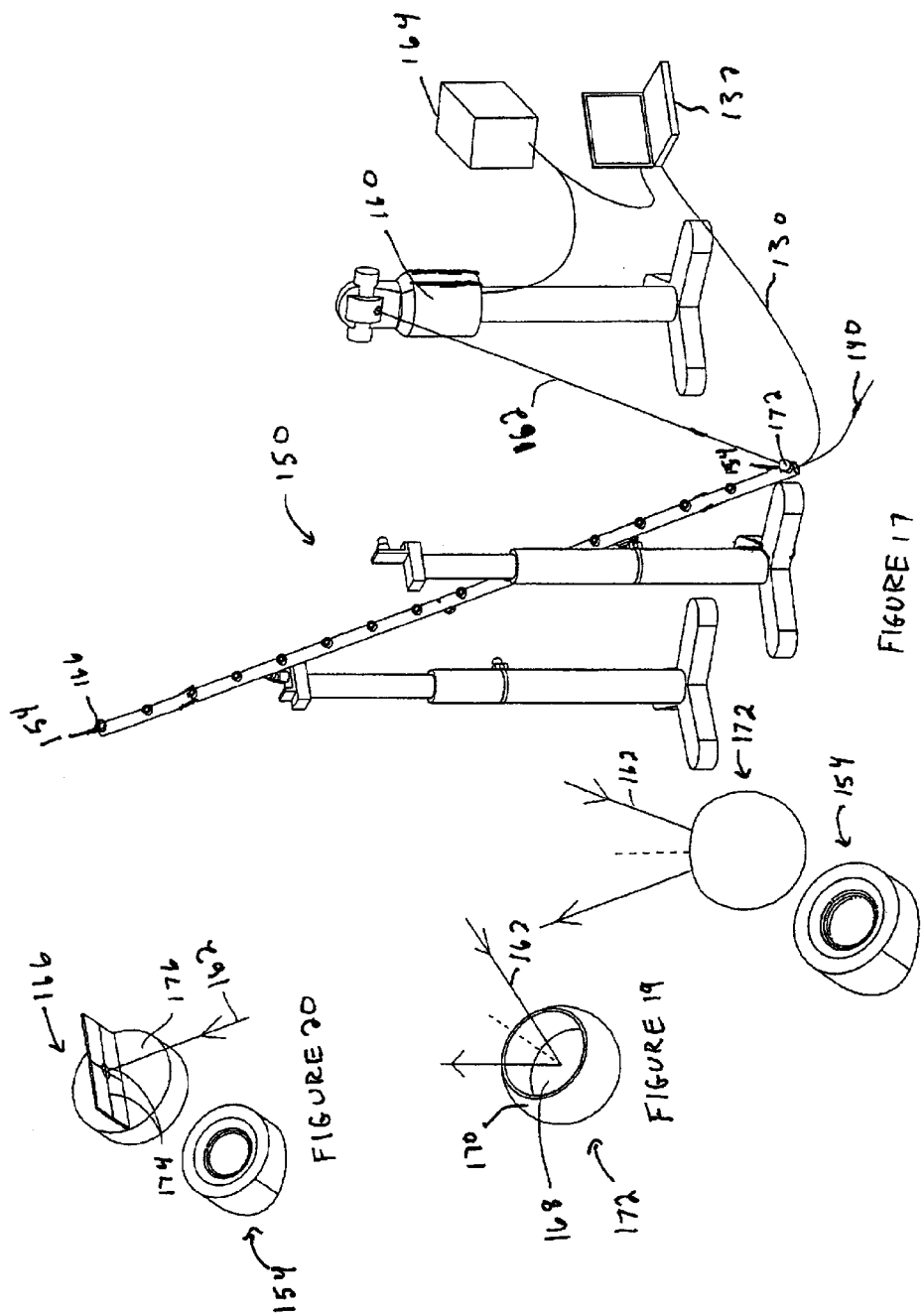

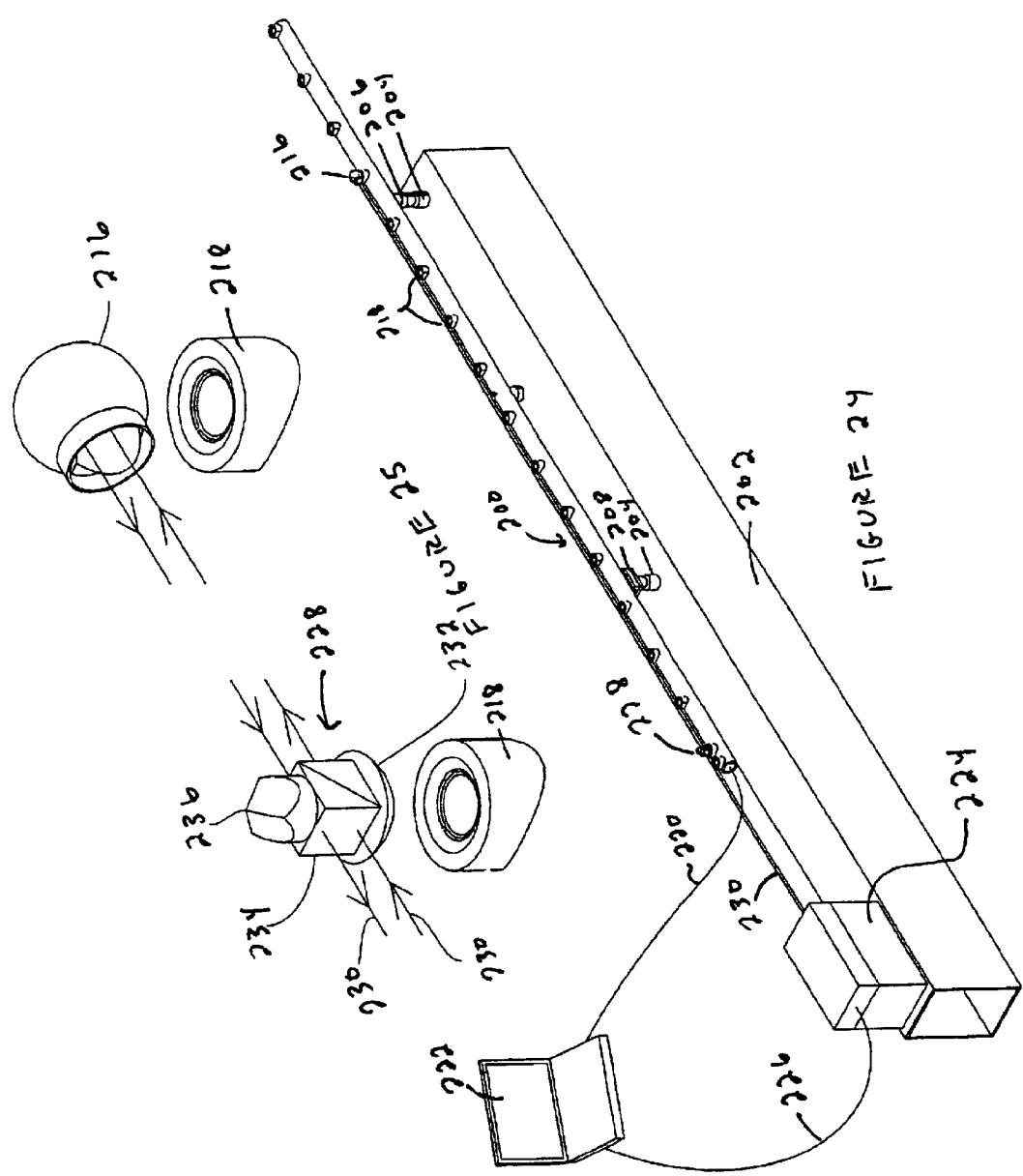

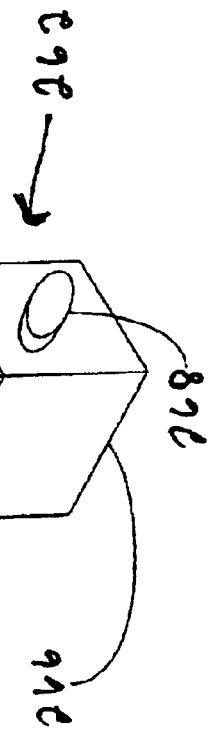
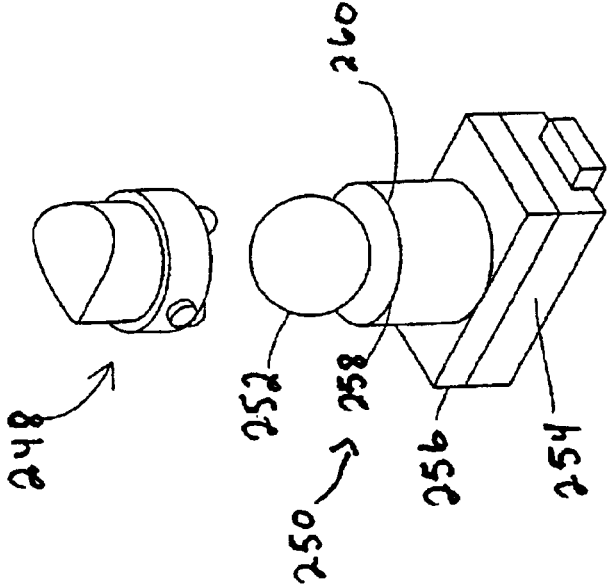

SCALE-BAR ARTIFACT AND METHODS OF USE

CROSS-REFERENCE TO RELATED APPLICATIONS

This application claims the priority of U.S. Provisional Patent Application Ser. No. 60/273,339, filed Mar. 6, 2001, the entire contents of which are specifically incorporated by reference herein.

BACKGROUND

The present disclosure describes a scale-bar artifact used either to assess the performance of or determine the compensation parameters for a coordinate measurement device.

Generally speaking, any device that measures from one to six dimensions (degrees-of-freedom) of an object is generically referred to as a coordinate measurement device (CMD). Some coordinate measurement devices (CMDs) measure a single dimension only (for example, a distance or an angle); other devices measure three dimensions (for example, the rectangular coordinates of a point in space); and still other devices measure six dimensions (for example, the rectangular coordinates plus the pitch, yaw, and roll angles of a rigid body).

For most CMDs, two types of tests are performed at various times throughout the life of the device: the compensation tests and the performance-verification tests. The compensation tests are performed to determine numerical values known as compensation parameters. These numerical values are used by a computer, microprocessor, or similar computing device to remove small systematic errors and improve measurement accuracy of the CMD. The performance-verification tests are performed to ensure that the CMD meets its published performance specifications. Ideally, the performance-verification tests are carried out in such a way as to be traceable to the standards at a National Measurement Institute.

The laser tracker is a type of coordinate measurement device that can be used to measure three-dimensional coordinates in space. The laser tracker sends a laser beam to a retroreflector target that is held against a surface of interest or placed into a fixed nest. The most common type of retroreflector target is the spherically mounted retroreflector (SMR). The SMR comprises a cube-corner retroreflector mounted within a sphere with the vertex of the cube-corner at the sphere center. A gimbal mechanism within the laser tracker directs a laser beam from the tracker to the SMR. Part of the light retroreflected by the SMR enters the laser tracker and passes onto a position detector. A control system within the laser tracker uses the position of the light on the position detector to adjust the rotation angle of the mechanical azimuth axis and the mechanical zenith axis of the laser tracker to keep the laser beam centered on the SMR. In this way, the laser beam is able to track an SMR that is moved over the surface of an object of interest. Part of the light retroreflected into the laser tracker passes into a distance-measuring device (distance meter) such as an interferometer or absolute distance meter (ADM). Angular encoders attached to the mechanical azimuth and zenith axes of the tracker measure the azimuth and zenith angles of the laser beam (with respect to the tracker frame of reference). The one distance and two angles measured by the laser tracker are sufficient to completely specify the three-dimensional location of the SMR.

One system-level performance-verification test for a laser tracker involves locating a calibrated scale-bar (artifact) in a succession of different orientations. The most common orientations are horizontal, vertical, left-diagonal, and right-diagonal. At each orientation, the laser tracker measures the coordinates of two or more positions, defined on the bar by magnetic nests designed to hold an SMR. The laser tracker is moved away from the scale-bar to a variety of positions and is rotated into a variety of orientations. At each position and orientation, the length of the scale-bar is calculated from the coordinates measured by the laser tracker and compared to the reference length of the scale-bar, which is known to high accuracy. Usually, the maximum discrepancy between the measured and reference length that is allowable for any particular measurement depends on the specifications for the particular laser tracker and also on the geometry of the laser tracker relative to the scale-bar.

For the laser tracker, a performance-verification test is often performed for a distance-measuring subsystem (interferometer or ADM), as well as for the overall system. One way to verify the performance of a distance-measuring device within the tracker is to compare its readings to those of a reference interferometer. This comparison may be made by placing a retroreflector target that intercepts the laser beam from the tracker back-to-back against a retroreflector that intercepts a laser beam sent out by the reference interferometer. Usually, the target/retroreflector assembly is moved along a rail. At each point along the rail, the sum of distances measured by the interferometer and the distance-measuring device should be constant. Any discrepancy from a constant value is regarded as an error in the distance-measuring device of the tracker. At many facilities, it is impractical because of expense and time to set up an automated interferometer rail of the sort described above. In these situations, an alternative performance-verification procedure is needed.

Although most interferometers do not require compensation, many absolute distance meters (ADMs) have compensation parameters that must be determined, perhaps periodically, to maintain maximum accuracy. The nature of the compensation parameters depends on the technology of the particular ADM, but to be specific we consider the case of an ADM that determines distance by intensity modulating laser light with a sinusoidal waveform and then comparing the measured phase of the light bounced off the target to the measured phase of light traveling in a reference path within the ADM. In such a system, an error may be caused when laser light reflects off optical components and into the ADM or when there is electrical cross talk among electrical components in the system. Such errors are referred to as cyclic errors because they vary sinusoidally with distance from the laser tracker. The period of such deviations is usually equal to the ADM ambiguity range divided by an integer m=1,2, . . . . The ADM ambiguity range is equal to $c/2f_m n_g$, where c is the speed of light in vacuum, $f_m$ is the frequency of modulation of the laser, and $n_g$ is the group index of refraction of the air through which the laser beam travels. In the case of a laser tracker that contains an interferometer as well as an ADM, it is easy to compare interferometer and ADM measurements to determine the coefficients that define the magnitude and phase of the cyclic errors. However, in systems that contain an ADM but not an interferometer, an alternative method is needed to determine the ADM compensation parameters.

Although a calibrated scale-bar is often required for the testing of coordinate measurement devices, including the three degree-of-freedom laser tracker and the one degree-of-freedom ADM, there are practical problems in obtaining calibrated scale-bars that are sufficiently accurate over the wide range of temperatures that are present in many factory environments and that are affordable and easy to use. Most scale-bars available today are characterized at only one temperature, which is usually near 20 degrees Celsius. The most accurate of the scale-bars are usually constructed out of materials with a low thermal coefficient of expansion (TCE) such as Invar, SuperInvar, or composite material. However, the TCEs for such materials vary widely, and even the best of these materials can be counted on to have a constant length only at temperatures near 20 degrees Celsius. In addition, all of the aforementioned materials are expensive. Invar and Superinvar are also heavy, and composites tend to absorb moisture from the air. Most scale-bars available today have been designed for a laboratory environment having a well controlled temperature and humidity. Devices such as laser trackers, however, are used on a factory floor with temperatures and other environmental conditions that differ substantially from those found in a laboratory. To evaluate the performance of such devices on the factory floor, it is advisable to perform the performance verification procedures on the factory floor. For similar reasons, it is also advisable to compensate ADMs on the factory floor.

SUMMARY

The above discussed and other drawbacks and deficiencies of the prior art are overcome or alleviated by the scale-bar artifact measurement methods described herein. The scale-bar artifact comprises a shaft, at least one mounting nest positioned on the shaft, a plurality of target nests positioned on the shaft, at least one temperature sensor in contact with the material of the shaft and a computer or circuit board in communication with the at least one temperature sensor, wherein the computer or circuit board is configured to receive temperature sensor data and to compile temperature corrected distance measurements corresponding to at least one linear portion of the shaft.

In another embodiment, the scale-bar artifact comprises a shaft, a plurality of target nests positioned on the shaft and at least one mounting nest positioned on the shaft, wherein the at least one mounting nest comprises either at least one adjustable kinematic mounting nest or at least one fixed kinematic mounting nest configured to receive a separate mounting component.

Methods for measuring temperature compensation values of a scale-bar and for accurately measuring scale-bar length with a tracker interferometer are also described.

The above-discussed and other features and advantages of the scale-bar artifact and measurement methods will be appreciated and understood by those skilled in the art from the following detailed description and drawings.

BRIEF DESCRIPTION OF THE DRAWINGS

Referring now to the drawings, wherein like elements are numbered alike in the several FIGURES:

FIG. 1 depicts an exemplary scale-bar as viewed in perspective;

FIG. 2 depicts an expanded view of an exemplary target nest;

FIG. 3 depicts a second perspective view of the exemplary scale bar depicted in FIG. 1;

FIG. 4 depicts an expanded view of an exemplary fixed mounting nest;

FIG. 5 depicts an expanded view of an exemplary adjustable mounting nest;

FIG. 6 depicts in perspective view an exemplary scale-bar mounted in a left-diagonal orientation FIG. 7 depicts an expanded view of a fixed mounting nest in proximity to an exemplary separate mounting component;

FIG. 8 depicts an expanded view of an adjustable mounting nest in proximity to an exemplary separate mounting component;

FIG. 14 depicts in perspective view an exemplary scale-bar and laser tracker arrangement;

FIG. 15 depicts an expanded view of an exemplary spherically mounted retroreflector in proximity to a target nest;

FIG. 16 depicts a perspective view of an exemplary spherically mounted retroreflector;

FIG. 17 depicts in perspective view an exemplary scale-bar and laser tracker arrangement;

FIG. 18 depicts an expanded view of an exemplary spherically mounted mirror in proximity to an exemplary target nest;

FIG. 19 depicts a perspective view of an exemplary spherically mounted mirror;

FIG. 20 depicts an expanded view of an exemplary crosshair target in proximity to an exemplary target nest;

FIG. 24 depicts an exemplary scale-bar and reference interferometer arrangement;

FIG. 25 depicts an expanded view an exemplary arrangement of a reference interferometer laser beam, beam-splitter and retroreflector assembly, spherically mounted retroreflector assembly and target nest arrangement;

FIG. 27 depicts an expanded view of a fixed mounting nest in proximity to a separate, single dimension adjustable mount component;

FIG. 28 depicts an expanded view of a fixed mounting nest in proximity to a separate, two dimension adjustable mount component;

DETAILED DESCRIPTION OF EXEMPLARY EMBODIMENTS

Figure 9:
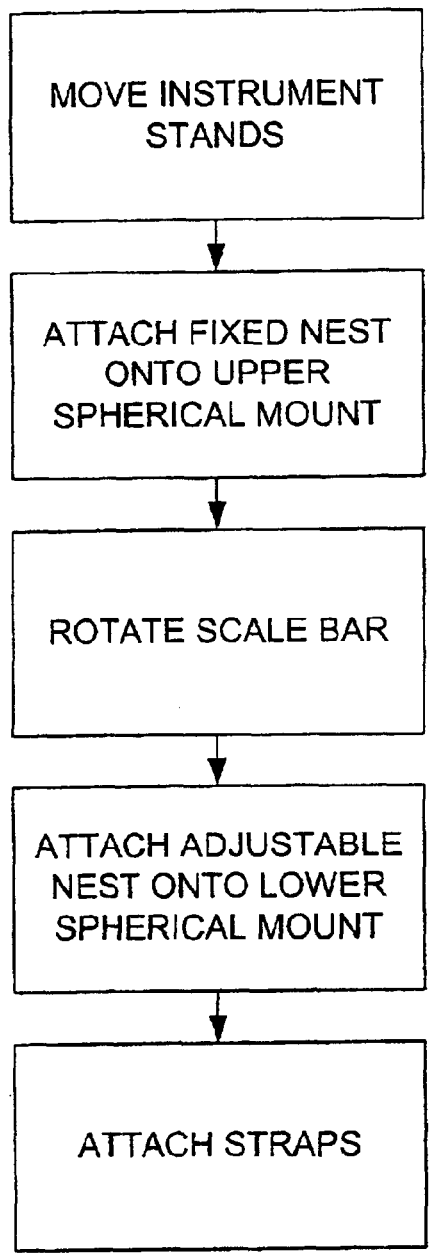
FIG. 9 lists exemplary steps in a procedure for securing a scale-bar artifact in a left-diagonal or right-diagonal orientation.

Reference will now be made in detail to exemplary embodiments, examples of which are illustrated in the accompanying drawings. The present disclosure generally describes a scale-bar that can be rigidly mounted in a variety of orientations and that has a length that is accurately known by two exemplary methods: (1) by reading a digital signal sent from the scale-bar over a collection of electrical wires or a wireless communication channel, or (2) by using an interferometer, such as a certified interferometer within a laser tracker, to determine the scale-bar length. These methods of determining length are explained in detail in the discussion that follows.

Scale-bar Characteristics

Two perspective views of an exemplary scale-bar are shown in FIGS. 1 and 3. Referring now to FIG. 1, a scale-bar artifact is illustrated generally at 10. The scale-bar 10 can be any length. In an exemplary embodiment, wherein the use is for performance verification of a gimbal mounted instrument, such as a laser tracker, the exemplary length is 3 meters (approximately 10 feet). In another exemplary embodiment, shaft 12 of the bar 10 is aluminum, with a hollow circular cross section having an outer diameter of approximately 50 mm and an inner diameter of approximately 38 mm. It should be recognized that while exemplary embodiments are generally described with references to sizes, shapes, and materials, other shapes, sizes, and materials can be used.

Extruded aluminum having the characteristics described above can be obtained for relatively low cost. In most cases, however, extruded metal is highly strained. Even aluminum that is not extruded is often intentionally strained to increase its strength. However, in a scale-bar shaft 12, internal strains release over time, resulting in a change in scale-bar length. To avoid this problem, an aluminum shaft may be obtained dead soft, or the aluminum may be stress-relieved through an annealing process.

The exemplary embodiment depicted by FIG. 1 shows magnetic target nests 14 affixed to one side of the scale-bar 10. These nests 14 may be glued to the shaft surface in a straight line.

Referring now to FIG. 2, in an exemplary construction, each nest 14 may be constructed of aluminum and be designed to accept a thin steel insert 16 having three pads 18 for support of a spherical surface. A magnet 20 that is strong enough to support a sphere of ferromagnetic material, such as chrome steel, may be embedded or otherwise positioned within the steel insert 16. The exact number of nests 14 may be varied according to the particular need, but in one embodiment, the nests 14 are separated by about 200 mm.

If the scale-bar 10 is to be used for compensation of an ADM as well as for performance verification of a laser tracker or similar device, the nests 14 may be spaced at intervals appropriate to determine the coefficients of the cyclic errors that might be present. For example, suppose that the laser source in an ADM is intensity modulated by a sine wave having a frequency of 3 GHz. The ambiguity range over which the phase of the returning modulated light changes from 0 to 240 degrees is equal to $c/2f_m n_g$, which in this case is approximately equal to 50 mm. If the errors of concern are first-order and second-order cyclic errors having periods of approximately 50 mm and 25 mm, respectively, then it is necessary to sample over several sine-wave cycles to obtain phase values distributed over the range of 0 to 240 degrees.

For example, in one embodiment, magnetic nests 14, shown in FIG. 1, are separated by approximately 200 mm, which is about 4 ambiguity ranges for 3 GHz modulation. By changing the spacing to 196 mm, the first-order cyclic error is sampled every 28.8 degrees and the second-order cyclic error is sampled every 57.6 degrees.

Referring now to FIG. 3, a second perspective view of a scale-bar artifact 10 is illustrated. FIG. 3 shows two fixed magnetic mounting nests 22 and one adjustable magnetic mounting nest 24 affixed to the shaft 12 of the scale-bar artifact 10.

Referring now to FIG. 4, an exemplary fixed magnetic mounting nest 22 is shown in greater detail. The illustrated fixed magnetic mounting nest 22 comprises a body 26, which is generally configured to affix to the shaft 12 of the scale-bar artifact 10, three kinematic spheres 28, a magnet 30, and two straps (e.g., Velcro) snapped or otherwise affixed to the body 26 at attachment point 34.

Referring now to FIG. 5, an exemplary adjustable magnetic mounting nest is illustrated in greater detail at 24. The adjustable magnetic mounting nest 24 illustrated by FIG. 5 generally comprises a linear bearing 38 attached at its bottom to a base 40 (e.g., may be aluminum, among other materials), which may be generally configured to affix to the shaft 12 of the scale-bar artifact 10, and attached at its top to a plate 42 that holds a magnet 44 (in an exemplary embodiment, the magnet 44 is a strong magnet) and kinematic spheres 46 (in an exemplary embodiment, three kinematic spheres 46 are held by the plate 42).

With reference to FIG. 6, an exemplary scale-bar artifact is illustrated generally at 50 in a left-diagonal orientation. The left-diagonal oriented scale-bar 50 illustrated by FIG. 6 generally comprises a shaft 52 supported by instrument stands 54. The shaft 52 is illustrated as having two fixed magnetic mounting nests 56 and one adjustable magnetic mounting nest 58. A fixed magnetic mounting nest 56 is mounted on an upper spherical mount, shown generally at 62, which is positioned on a base plate 64.

With reference to FIG. 7, an exemplary fixed magnetic mounting nest 56, similar to that illustrated by FIG. 4, is illustrated in proximity to an exemplary upper spherical mount 62. The illustrated fixed magnetic mounting nest generally comprises a body 66 configured to engage the shaft 52 of the scale-bar artifact 50, kinematic spheres 68 and straps 70. The upper spherical mount 62 generally comprises a sphere 72 (which, when attached to the fixed magnetic mounting nest, contacts the kinematic spheres 68 thereof) and a cylinder 74, which supports the sphere. In an exemplary embodiment, the cylinder is coated with an adhesive or other material 76 (e.g., Velcro covering), which may disengageably retain portions of the straps 70. In another exemplary embedment, the sphere 72 comprises a ferromagnetic sphere.

In one embodiment, the kinematic spheres 68 are magnetically pulled against the spherical surface 72 of the upper spherical mount 62. The cylinder 74 is illustrated in FIG. 6 attached to the base plate 62, which is mounted on an instrument stand adapter 60, which in turn mounts on the instrument stand 54. Generally, there may only be a very small contact area between the kinematic spheres 68 and the sphere 72 of the upper spherical mount 62. In such circumstances, there is only a very small flow of heat to or from the spherical mount 62 to the scale-bar 50. Where additional ensurance that the transfer of heat is negligible, the kinematic spheres 68 may be constructed of an insulative material, e.g. a ceramic material.

With reference to FIG. 8, an exemplary adjustable magnetic mounting nest, shown generally at 58, is illustrated in proximity to an exemplary lower spherical mount, which is shown generally at 78. Similar to the exemplary adjustable magnetic mounting nest 24 of FIG. 5, the adjustable magnetic mounting nest 58 of FIG. 8 generally comprises a linear bearing 80 attached to a base 82 (e.g., may be aluminum, among other materials), which may be generally configured to affix to the shaft 52 of the scale-bar artifact 50, and attached at its top to a plate 84 that holds a magnet (not shown) and kinematic spheres 86 (in an exemplary embodiment, three kinematic spheres 86 are held by the plate 84).

In one exemplary embodiment, the linear bearing 80 illustrated by FIG. 8 is adjustable to move from its central position by about 12 to 25 millimeters in each direction. The adjustability of the linear bearing may be advantageous for two reasons. First, it can ensure that the scale-bar 50 is free to expand without being subject to an axial force that could alter the length of the shaft 52 for a given ambient temperature. Second, it can simplify the setup of the scale-bar 50 and can prevent errors that can occur if the spherical mounts 62 are not exactly seated on the kinematic spheres 68 of the fixed magnetic mounting nest 56 or the kinematic spheres 86 of the fixed magnetic mounting nest 58. Exemplary advantages of this design in setting up the scale-bar 50 will become clear in the discussion that follows.

The kinematic spheres 86 of the adjustable magnetic mounting nest 58 rest on the lower spherical mount, shown generally at 78 in FIG. 8. In the illustrated embodiment, the lower spherical mount 78 comprises a sphere 88, an extender shaft 90, a V-plate 92, and a clamp 94. As illustrated, the sphere 88 may be anchored to the V-plate 92 by an extender shaft 90 that is long enough to provide clearance for an adjustable magnetic mounting nest 58. The clamp 94 may be provided to cinch the V-plate 92 tight against the instrument stand 54. While the above exemplary embodiment is illustrated and described, alternate designs and methods of affixation may be employed. For example, the plate 92 may form varying shapes as may be convenient. Additionally, the plate may be affixed to the desirable mounting position by alternate means. Accordingly, it is recognized that particulars of the exemplary embodiments described may be substituted by rough equivalents without departing from the spirit and scope of the claimed invention.

Referring generally to FIGS. 1 and 6, in an exemplary embodiment, the fixed 22, 56 and adjustable 24, 58 magnetic mounting nests may be located near the so-called 'Airy positions' at which the bending of the shaft 12, 52 may be minimized. In such an exemplary embodiment, it is not necessary to locate the mounting nests with precision, however, since shaft bending has very little effect on the quantity of interest, which is the distance between the magnetic target nests 14 on the scale-bar.

Mounting a Scale-bar

A procedure for mounting one particular exemplary scale-bar embodiment in a left-diagonal orientation is given in FIG. 9. The instrument stands 54 may be moved to their approximate final positions. A fixed magnetic mounting nest 56 may be snapped or affixed to the top of an upper spherical mount 62. The scale-bar shaft 52 on the upper spherical mount may be moved until the adjustable magnetic mounting nest 58 is just above a lower spherical mount 78. If necessary, an instrument stand 54 may be moved to complete the alignment. The adjustable magnetic mounting nest 58 may be snapped or affixed into place. It may be desirable to ensure that, where an adjustable embodiment is provided, the linear bearing in the adjustable magnetic mounting nest 58 is not at the end of its range. The straps of the fixed magnetic mounting nest 56 may be attached to the upper spherical mount. Thus, the scale-bar 50 may be constrained to a stable position. The scale-bar 50 and mount described herein and by other equivalent exemplary embodiments provide simple and quick means for obtaining a stable mount for any scale-bar orientation.

Figure 10:
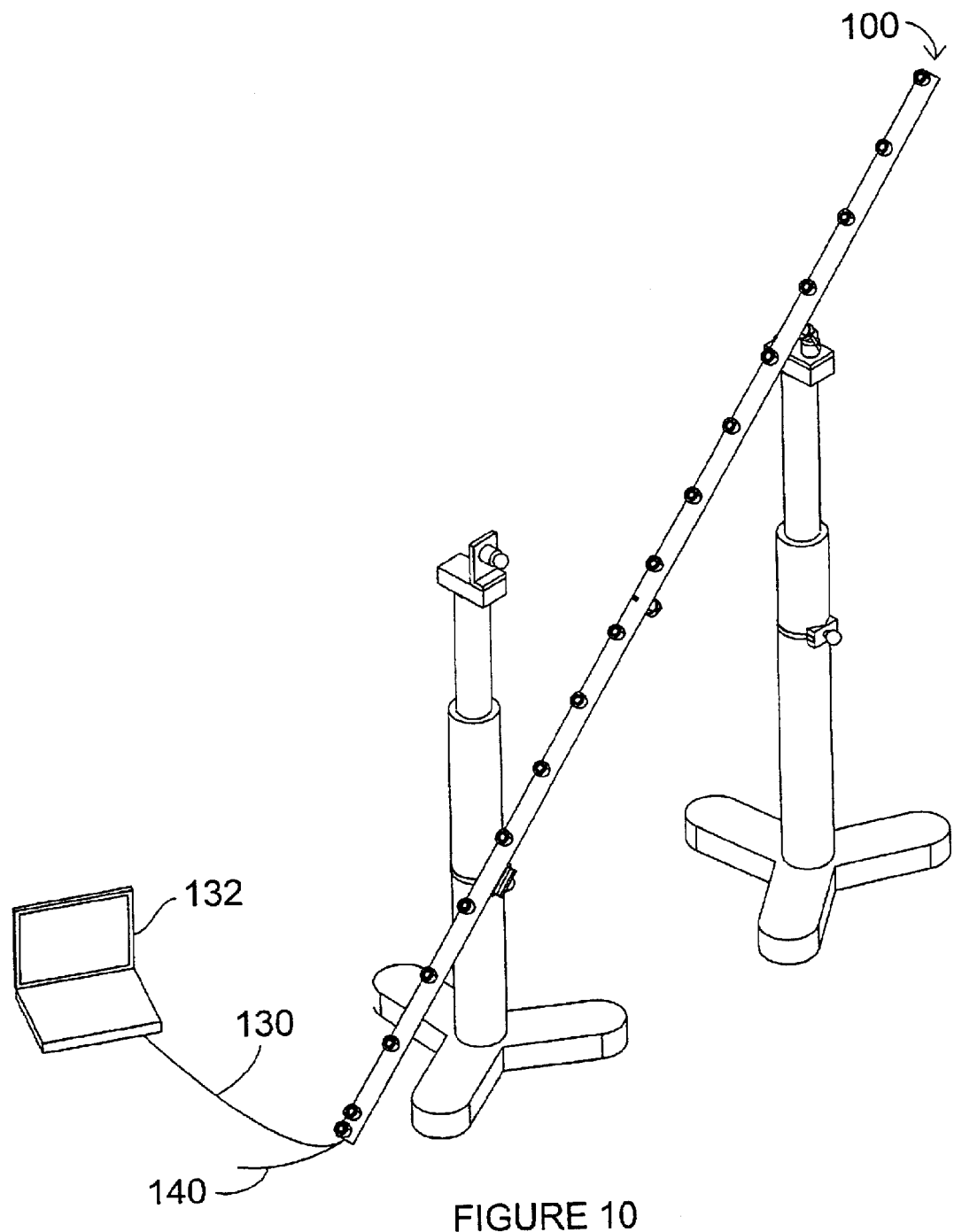
FIG. 10 depicts in perspective view an exemplary scale-bar mounted in a right-diagonal orientation.
Figure 11:
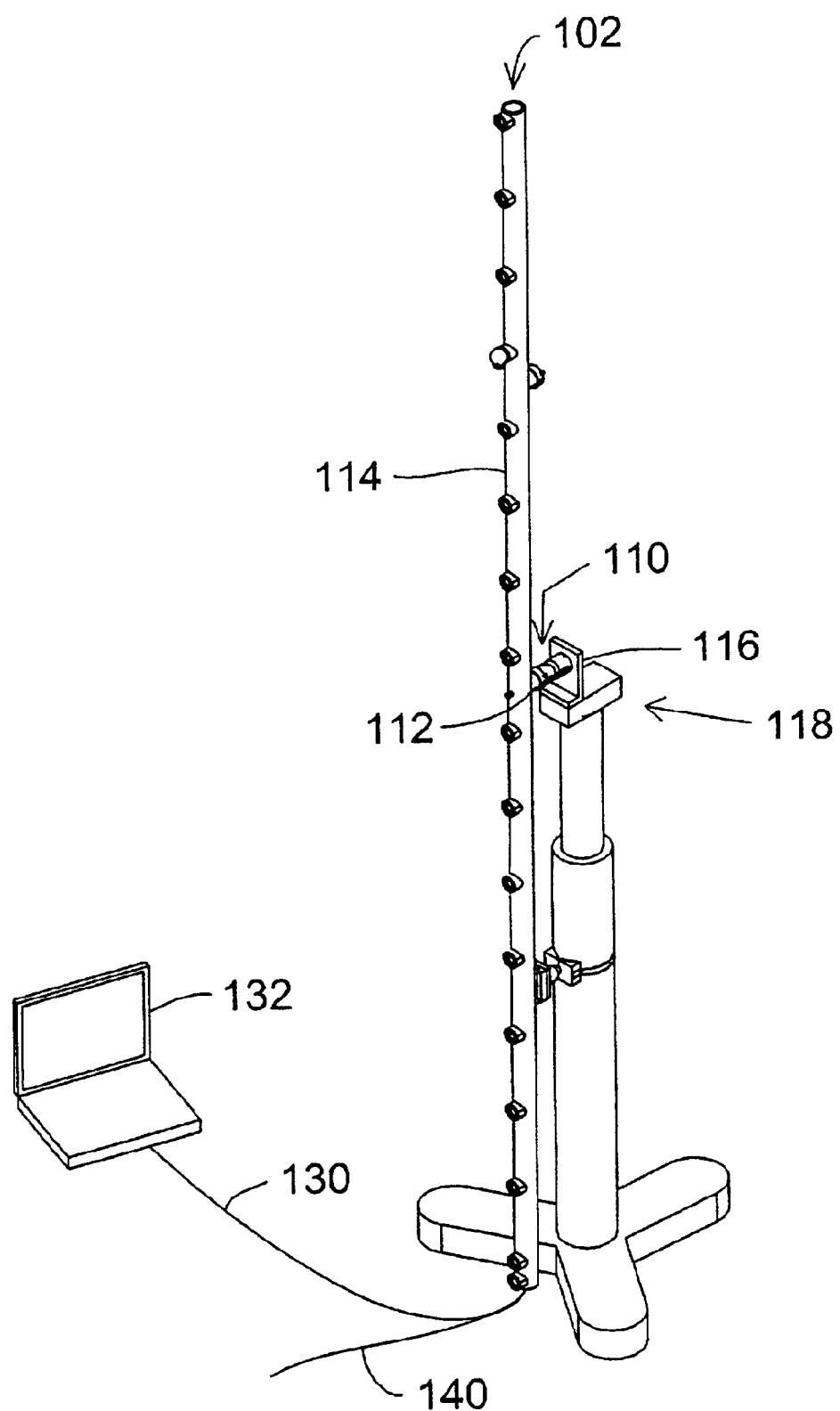
FIG. 11 depicts in perspective view an exemplary scale-bar mounted in a vertical orientation.
Figure 12:
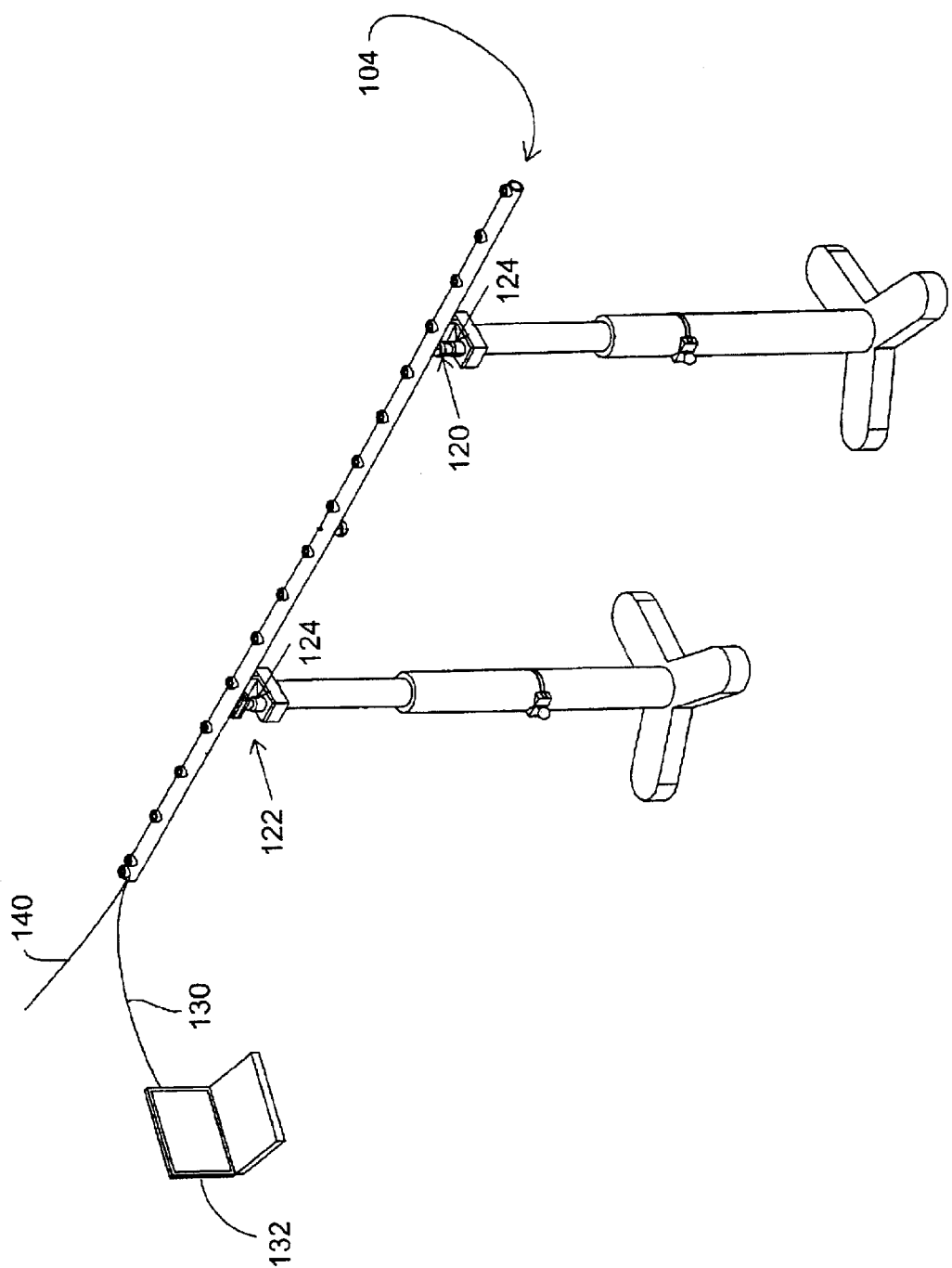
FIG. 12 depicts in perspective view an exemplary scale-bar mounted in a horizontal orientation.

FIGS. 10, 11, and 12 generally show the scale-bar artifact mounted in exemplary right-diagonal, shown generally at 100, vertical, shown generally at 102, and horizontal, shown generally at 104, orientations, respectively. The right-diagonal orientation of FIG. 10 may simply be the mirror image of the left-diagonal orientation of FIG. 6. For the vertical orientation of FIG. 11, the upper spherical mount, shown generally at 110 may be snapped or otherwise affixed to a fixed magnetic mounting nest 112 located near the center, rather than the top, of the scale-bar shaft 114. Also, the base plate 116 may be rotated by 90 degrees (relative to the orientation of the base-plate 64 in FIG. 6) before it is attached to the instrument stand adapter, shown generally at 118.

Referring now to the illustrated exemplary horizontal orientation of the scale-bar 104 of FIG. 12, both the fixed 120 and adjustable 122 magnetic mounting nests may be snapped or otherwise affixed onto upper spherical mounts 124.

Determining the Reference Length

Two exemplary methods for determining the reference length of the scale-bar artifact were previously mentioned. One of these methods is to read the digital signal sent from the scale-bar over a collection of electrical wires or via a wireless channel. A collection of electrical wires used for this purpose may be referred to as a digital data line. Exemplary digital data lines are shown generally at 130 in FIGS. 1, 3 and 6. Exemplary digital data lines 130 are also generally shown as connected to a computer 132 in FIGS. 6, 10, 11 and 12. The digital data sent over the digital data line (or via a wireless scheme) may give the distance from a designated reference nest to each of the other nests according to the temperature of the scale-bar, and may also give, among other data, the air temperature measured by optional air-temperature sensors shown generally at 141 in FIGS. 1 and 3.

Among other methods, with reference to FIG. 3, the temperature of the scale-bar may also measured by temperature sensors 134 positioned within or on any portion of the shaft of the scale-bar. In one exemplary embodiment, one or more temperature sensors 134 are provided.

In another embodiment, the one or more temperature sensors 134 comprises a thermistor placed in series with a voltage reference and a known resistance. The voltage dropped across the thermistor may be amplified and sent to an analog-to-digital converter (ADC). The transfer function of the combined amplifier and ADC may be determined by a compensation procedure in which the thermistor is replaced by a known resistance. Because the resistance of the thermistor changes in a predictable way as a function of temperature, the temperature of the thermistor can be determined. The thermistor-based electrical circuit embodiment described above may be advantageous in that it is inexpensive, yet highly accurate.

In another embodiment, six epoxy-encapsulated thermistors 134 are fixed with thermal epoxy into six small holes drilled into the aluminum shaft. The holes are spaced more-or-less evenly over the length of the shaft. The electrical wires 124 from the thermistors are routed inside the shaft 12 and attached to a small circuit board 138 mounted inside the shaft 12 near the digital data line 130. The circuit board 138 may also contain a voltage regulator, a nonvolatile memory, a digital-signal processing module, and a communication transceiver for sending information onto the digital data line 130. The digital data line 130 may optionally be connected to a computer 132 or other device, e.g., through a port such as an RS-232 port, or it may be connected to a coordinate measurement device, such as a laser tracker through an input port. The nonvolatile memory stores data values collected during a thermal-compensation procedure as explained in the discussion below. The power required by the components on the circuit board 138 is delivered by a power line 140. The power line 140 may, e.g., be attached to a transformer plugged into the power mains or to a power supply provided specifically for this purpose.

Figure 13:
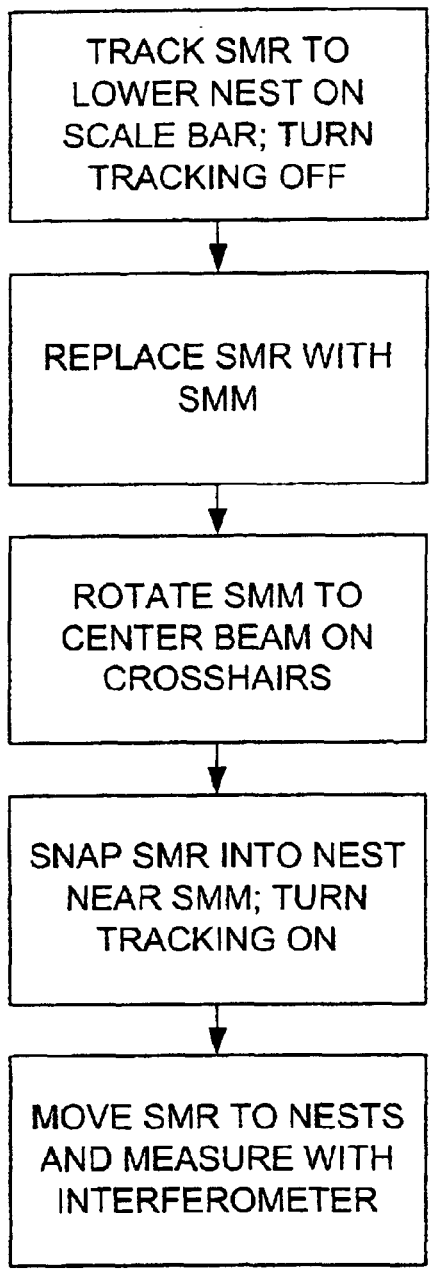
FIG. 13 lists exemplary steps in a procedure for measuring the length of a scale-bar by using an interferometer within a laser tracker or similar device.

A second exemplary method of determining the length of the scale-bar artifact is to use a certified interferometer found in a laser tracker or similar device. An interferometer is said to be certified if its performance has been verified, for example, by comparing its readings to those of a reference interferometer as described previously. FIG. 13 lists exemplary steps in this procedure, and FIGS. 14–16 show the steps graphically.

Referring now to FIG. 14, an exemplary diagonally oriented scale-bar is shown generally at 150. In relevant part, an exemplary spherically mounted retroreflector (SMR) 152 is illustrated as positioned against the lower target nest 154 of the scale-bar 150. An exemplary laser tracking interferometer device is shown generally at 160 positioned such that a laser beam 162 is directed at the SMR 152. The tracking device is connected to an exemplary tracker electronics box control unit 164 and computer 132.

Referring now to FIG. 15, an exemplary SMR, shown generally at 152, is illustrated in proximity to an exemplary target nest, shown generally at 154.

Referring now to FIG. 16, an exemplary SMR 152 is shown in greater detail. The illustrated exemplary SMR 152 comprises a spherical body 156 housing three intersecting reflective surfaces 158, which may be a cube-corner retroreflector arrangement.

Referring now to FIG. 17, an exemplary horizontally oriented scale-bar is shown generally at 150. In relevant part, an exemplary spherically mounted mirror (SMM) 172 is illustrated as positioned against the lower target nest 154. Additionally, an exemplary crosshair target 166 is illustrated as positioned at a target nest 154 located on an opposite end of the scale-bar artifact 150.

Referring now to FIG. 18, an exemplary SMM, shown generally at 172, is illustrated in proximity to an exemplary target nest, shown generally at 154. An exemplary light beam 162 is illustrated with incoming and outgoing reflected beams.

Referring now to FIG. 19, an exemplary SMM 172 is shown in greater detail. The exemplary SMM 172 generally comprises a planar mirror 168 centered within a rigid spherical shell 170, which may be a ferromagnetic material, among other materials.

Referring now to FIG. 20, an exemplary crosshair target 166 is shown in proximity to a target nest 154. The exemplary crosshair target generally comprises a crosshair-embossed plate 174 and a base 176, which in one embodiment is a cylindrical base 176 that is generally configured to engage a target nest 154. In another embodiment, the base is a hollow cylindrical base 176 that is configured to fit snugly over the magnetic target nest 154. An incoming laser beam 162 is illustrated as directed to the crosshair target plate 174.

Figure 21:
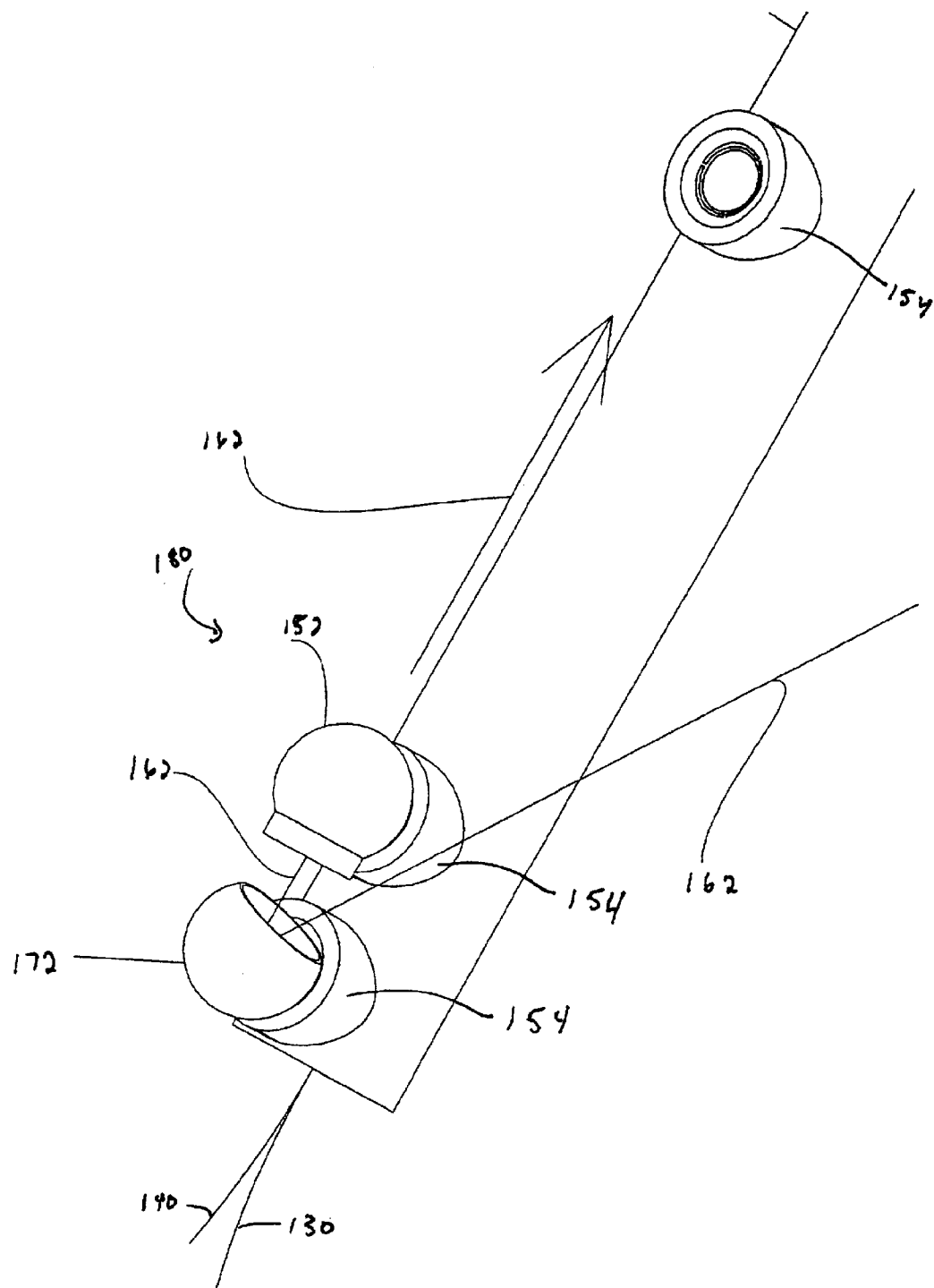
FIG. 21 depicts a perspective view of an exemplary scale-bar end portion, including an exemplary spherically mounted mirror and an exemplary spherically mounted retroreflector.

Referring now to FIG. 21, a shaft end of an exemplary scale-bar artifact is illustrated generally at 180. An SMM 172 is illustrated as being positioned in proximity to a target nest 154. An SMR 152 is illustrated as being positioned in proximity to a second target nest 154. An incoming laser beam 162 is reflected by the SMM 172 and directed to the SMR 152. The SMM 172 may be positioned such that the reflected laser beam 162 would be directed to the SMR at any of the target nests 154.

Referring now to FIG. 13, an exemplary procedure for measuring scale-bar length with a tracker interferometer is generally described. Such a procedure may include turning on the tracking function of a tracking interferometer and sending a laser beam 162 from the tracker 160 to a spherically mounted retroreflector (SMR) 152, which may optionally be positioned at target nests 14 along the scale-bar shaft 12. The SMR 152 may be moved to the target nest 154 at the lower end of the scale-bar 150. The tracking function may be turned off, and the SMR 152 may be removed from the nest 154. As long as the tracking function is turned off, the laser beam 162 will not follow.

A spherically mounted mirror (SMM) 172 may be positioned in the lowest target nest 154. A crosshair target 166 may be provided over a nest 154 at the other end portion of the scale-bar 150. The SMM 172 may be rotated or otherwise aligned until a reflected laser beam 162 is centered on the target crosshairs 174. These crosshairs 174 may be located so that the laser beam 162 from the SMM 172 is directed to intersect the center of an SMR 152 when placed in any of the scale-bar nests 154 with the tracking function turned off. Thus, the crosshair target 166 may be removed and the SMR 152 may be positioned in the nest 154 nearest to the nest 154 containing the SMM 172. The laser tracking function may be turned back on and the SMR 152 may be moved from nest 154 to nest 154 such that the tracker interferometer may determine the distance between nests 154.

An Exemplary Method of Determining Numerical Values To Be Stored in Nonvolatile Memory To determine the numerical values to be stored in the nonvolatile memory of the scale-bar circuit board, a temperature-compensation procedure may be performed. The steps of the exemplary procedure are outlined in flowchart of FIG. 22.

Figure 23:
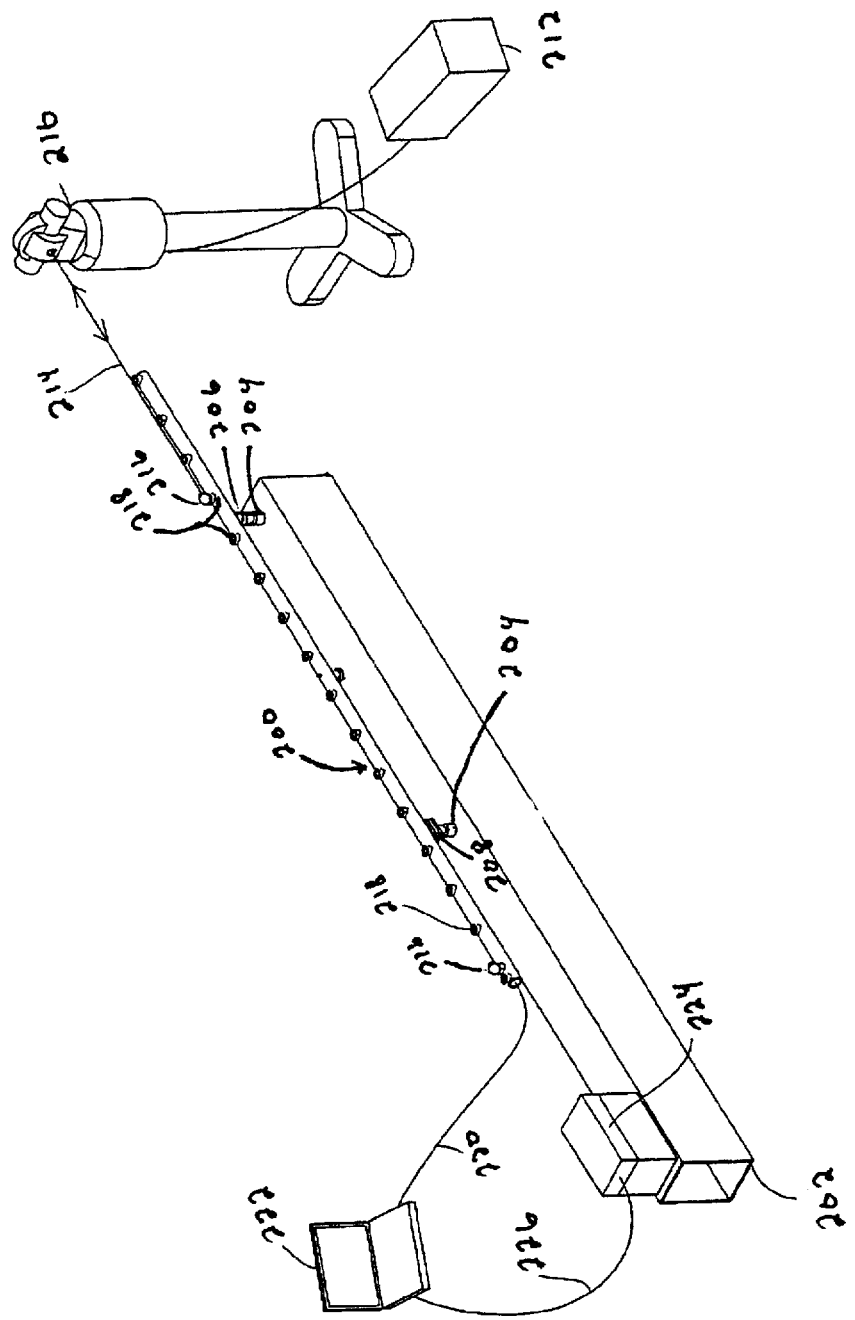
FIG. 23 depicts in perspective view an exemplary scale-bar, laser tracker and reference interferometer arrangement.

Referring now to FIG. 23, an exemplary scale-bar artifact 200 is illustrated mounted to a rigid structure 202. The scale-bar artifact 200 is illustrated as being mounted on two upper spherical mounts 204, one connected to a fixed magnetic mounting nest 206 and another connected to an adjustable magnetic mounting nest 208. An exemplary laser tracker 210 is illustrated connected to a tracker electronics control box 212. The laser tracker 210 is illustrated as outputting a laser beam 214 directed to an SMR 216 positioned at a target nest 218. A second SMR 216 is illustrated as being positioned at an opposite end of the scale-bar 200. A digital data line 220 connects to a computer 222. Additionally, a reference interferometer 224, illustrated as positioned on the rigid structure 202 may connect to the computer 222 via an interferometer data line 226.

Referring now to FIG. 24, an exemplary reference interferometer and scale-bar artifact arrangement is illustrated. An exemplary beam-splitter and retroreflector assembly 228 is illustrated as being positioned at a target nest 218. An SMR 216 is illustrated as being positioned at a second target nest 218. A reference interferometer 224 is mounted to a rigid structure 202 and outputs a laser beam 230, which is reflected by the SMR.

Referring now to FIG. 25, the exemplary arrangement of the laser beam 230, beam-splitter and retroreflector assembly 228 and SMR 216 is shown in greater detail. The SMR 216 and the beam-splitter and retroreflector assembly 228 are each shown in general proximity to target nests 218, which are positioned on the scale-bar shaft (illustrated in FIG. 24). The exemplary beam-splitter and retroreflector assembly 228 generally comprises a base 232, which may be, among others, a spherical section of ferromagnetic material, a polarizing beam splitter 234, or equivalent, positioned on the base 232 and a cube-corner retroreflector 236, or equivalent, positioned on the polarizing beam splitter 234. The laser beam 230 originates from the reference interferometer 224, passes through the beam-splitter and retroreflector assembly 228, is reflected by the SMR 216 and returns through the beam-splitter and retroreflector assembly 228 to the reference interferometer 224.

Figure 22:
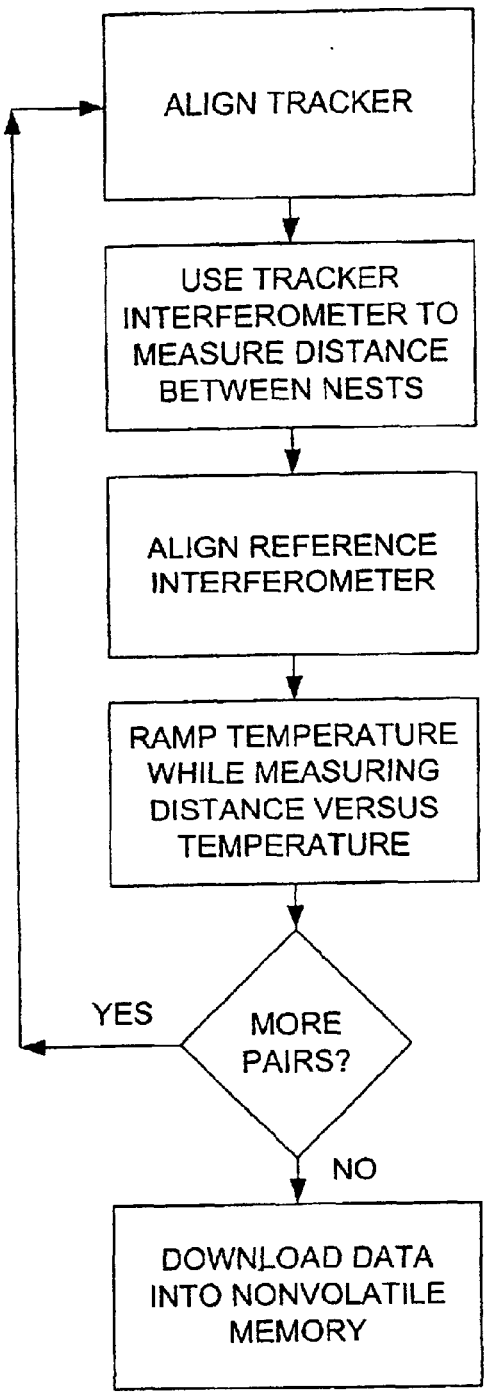
FIG. 22 lists exemplary steps in a procedure for correcting scale-bar length as a function of scale-bar temperature.

With reference to the flowchart illustrated by FIG. 22, the laser tracker may be aligned so that, with the tracking function turned off, the tracker laser beam 214 intersects the center of an SMR 216 placed in any of the scale-bar nests 218. The tracking function may be turned on and the tracker interferometer of the laser tracker 210 may be used to measure the distance between each pair of nests 218. This may be done by moving the SMR 216 from one nest 218 to another over the length of the scale-bar 200. To improve accuracy, the temperature may optionally be read from an air-temperature sensor (141 in FIG. 1) on the scale-bar (rather than a temperature sensor internal to the laser tracker) to calculate the air index of refraction in the interferometer distance calculation.

The reference interferometer 224 may be aligned as shown in FIG. 24. To perform the exemplary alignment, two nests 218 that are to be used are selected. An SMR 216 may be positioned on the nest 218 farther from the reference interferometer 224, and a beam-splitter and retroreflector assembly 228 may be placed in the nest 218 nearer to the reference interferometer 224.

In one embodiment, the base 232 of the beam-splitter and retroreflector assembly 228 is just thick enough to place the center of the polarizing beam splitter 234 at the height of the center of the SMR 216. Adjusting the height in this way minimizes Abbe error by limiting the effects of scale-bar bending to common-mode error. In other words, bending causes the same error in both the compensation and measurement procedures. With the reference interferometer 224 correctly aligned, the beam 230 reflected by the SMR 216 aligns with the beam 230 reflected by the beam-splitter and retroreflector assembly 228, and both beams re-enter the reference interferometer 224 at the appropriate position.

Measurement with the reference interferometer may proceed while ramping the temperature of the enclosure that contains the test setup described above and illustrated generally by FIG. 24. The average temperature of temperature sensors (134 in FIG. 3) embedded within the scale-bar shaft may be continually monitored. Thus it is possible to record the interferometer reading for average temperature changes of a predetermined amount (for example, by 0.1 degrees Celsius). Successive interferometer readings may be subtracted to determine the change in distance between the SMR 216 and the beam-splitter and retroreflector assembly 228. Where improvement in accuracy is desired, the temperature may be read from an air-temperature sensor (141 in FIG. 1) on the scale-bar (rather than from a temperature sensor of the reference interferometer 224) to calculate the air index of refraction in the interferometer distance calculation.

In the described exemplary embodiment, both the reference interferometer 224 and the interferometer within laser tracker 210 are incremental distance meters, which means that they both measure the change in distance of a retroreflector target from a reference position. For the laser tracker portion of the procedure above, the laser tracker 210 determines the distance between each pair of nests 218 as the SMR 216 is moved from nest to nest 218. For the reference-interferometer portion of the measurement, the SMR 216 and beam-splitter/retroreflector assembly 228 are fixed in place as the temperature of surrounding air is varied. Consequently, in the described exemplary embodiment, the reference interferometer 224 does not determine the distance between any pair of targets 218. Instead, the reference interferometer 224, in the described exemplary embodiment, measures the change in distance between the two selected targets as a function of temperature. Therefore, the distance between the two selected nests 218 at any given temperature is equal to the distance between the two nests 218 as measured by the laser tracker 210 (at the starting temperature) plus the change in distance measured by the reference interferometer 224 (at the given temperature).

This exemplary procedure is sufficient to determine the distance between the two selected nests 218 as a function of temperature. The distance between any other pair of nests 218 on the scale-bar can be determined in accordance with the additional exemplary procedural embodiments.

In one embodiment, a second pair of nests is selected and the above described procedures are followed. When all of the desired data has been collected, the data is downloaded into nonvolatile memory on the scale-bar circuit board (138 in FIG. 3).

In another embodiment, an assumption is made that the distance between each pair of nests 218 changes in the same proportion as the distance between the first two nests 218. For example, suppose that the temperature-compensation procedure begins at 3 degrees Celsius with a length between the two reference points A and B of 2.300000 meters and the length between two other points C and D of 1.000000 meters. If the length of the bar at 33 degrees Celsius is 2.301628 meters, then the distance between C and D is calculated to be 1.000000·2.301628/2.300000=1.000708 meters. When all of the desired data has been collected, the data is downloaded into nonvolatile memory on the scale-bar circuit board (138 in FIG. 3).

Accuracy of the Reference Length

Two exemplary methods of determining the reference length between nests 218 on the scale-bar were previously described. These methods comprise determining the reference length between nests 218: (1) from data sent over the digital data line 220 to a computing device 222; or (2) from measurements made with a certified interferometer within a laser tracker 210 or similar device. We now consider the accuracy of these two exemplary methods. The fixed 206 and adjustable 208 magnetic mounting nests attached to the scale-bar shafts are made with kinematic spheres (see 28 in FIG. 4), in one embodiment, ceramic material. Thermal conduction through such exemplary spheres is very small, and, consequently, heat is mostly transferred into or out of the scale-bar, which in another embodiment is aluminum, through convection with the surrounding air. Because the thermal conductivity of aluminum is high, the temperature of the aluminum shaft will be nearly uniform, with slight temperature variations occurring gradually rather than suddenly. Under such conditions, the average temperature of the scale-bar can be accurately estimated from the average temperature measured by temperature sensors (e.g., 134 in FIG. 3) within the scale-bar artifact. If, however, the variation in the temperature of the air that surrounds the scale-bar is large enough to produce significant differences in the readings of the temperature sensors provided within the scale-bar, then these variations can be included in the calculations described below.

Ordinarily, material temperature sensors configured as described above will have an accuracy of 0.1 or 0.2 degrees Celsius, and in most cases the average temperature of the scale-bar can be estimated to similar accuracy. The TCE of aluminum is approximately 20 parts per million (ppm) per degree Celsius, so a first estimate of the accuracy of the reference scale-bar length is 2 to 4 ppm. (The accuracy of the scale-bar length in ppm is multiplied by the scale-bar length in meters to obtain the accuracy of the scale-bar length in micrometers.) However, for any pair of points measured by the procedure described above with reference to FIG. 22, the accuracy is actually better than this estimate of 2 to 4 ppm, because errors in the temperature-sensor measurements are mostly common mode and tend to cancel out. In other words, the errors in the temperature sensors are nearly equal in the measurement and compensation procedures. Each digital distance sent out by the scale-bar circuit board, therefore, corresponds closely to values that would have been measured by perfect temperature sensors.

With the errors in the temperature sensors mostly eliminated, the main errors that remain are those associated with the reference interferometer and the interferometer within the laser tracker. If the resolution of the tracker interferometer 210 is a fraction of a micrometer, and if the operator follows good measurement procedures, the distance-measuring error of the temperature-compensation procedure should not exceed 2 or 3 micrometers, which is less than 1 ppm in a 3-meter scale-bar. Consequently, for any pair of nest locations that have been measured by the temperature compensation procedure, the length between the nests is expected to be known to an accuracy of 2 ppm or better, even as temperature is varied.

The second described exemplary method of determining the reference length of the scale-bar is to measure the distance between nests with a certified interferometer within a laser tracker 210 or similar device. The accuracy with this method is about 2 micrometers, assuming that the interferometer has sub-micrometer resolution and that the operator follows good measurement practices. However, it is still advantageous to monitor the temperature of the scale-bar and to make appropriate corrections to the scale-bar length with temperature. An uncorrected change of 1 degree Celsius, for example, will result in an error in the length of an aluminum scale-bar length of about 20 ppm, which is equivalent to about 60 micrometers for a 3-meter scale-bar.

Figure 26:
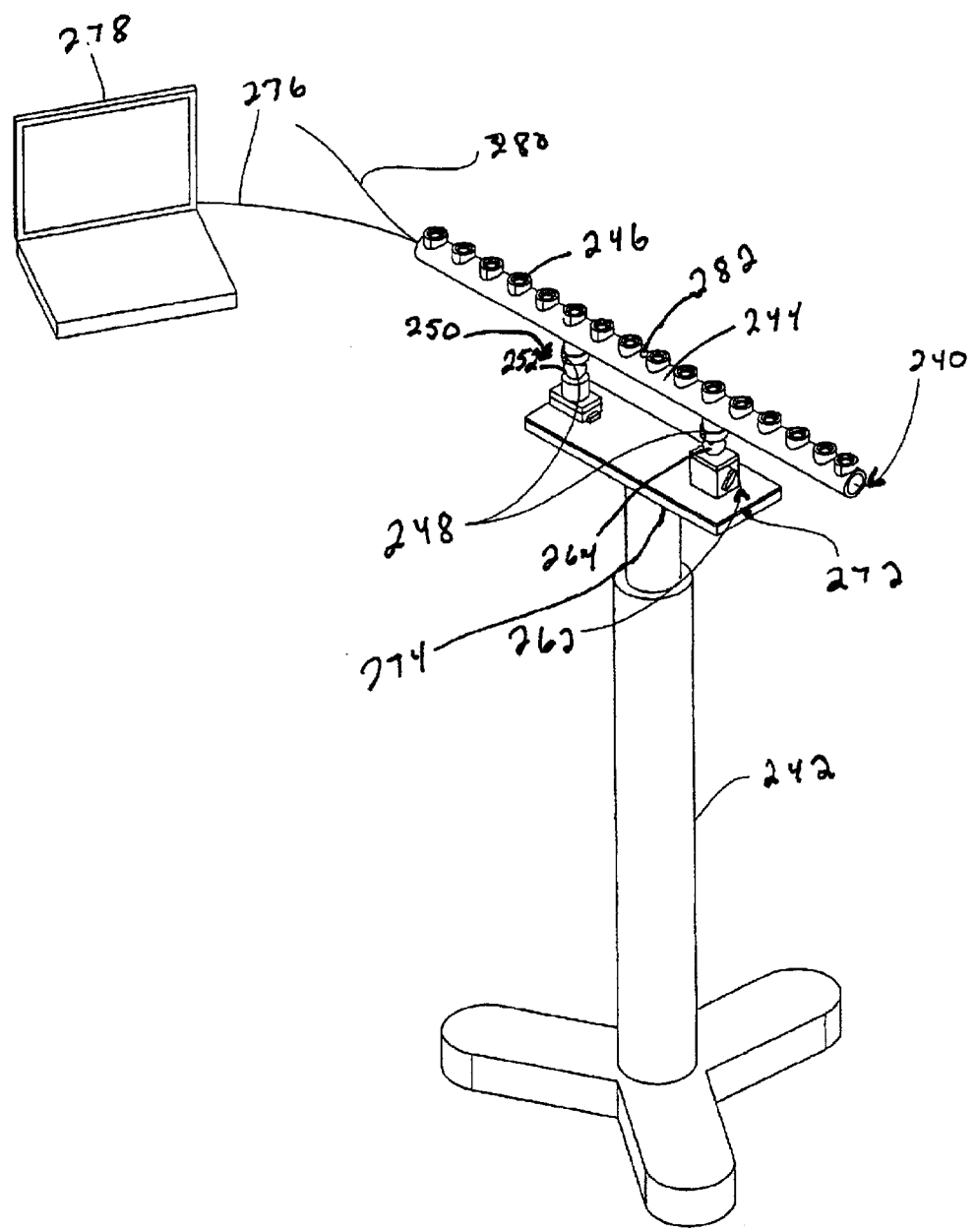
FIG. 26 depicts in perspective view an exemplary plate-mounted scale-bar optimized for compensation and performance verification of ADMs.

With reference to FIG. 26, an additional exemplary embodiment of the scale-bar artifact is illustrated generally at 240. The illustrated scale-bar 240 is similar to the scale-bar of the FIG. 1, except that length is reduced and the mounting configuration is changed. The smaller scale-bar 240 is particularly well suited to performance verification and compensation of distance meters, especially absolute distance meters. Compared to the exemplary scale-bar described by FIG. 1, the smaller scale-bar 240 of the exemplary embodiment described by FIG. 26 is less expensive, may easily be mounted on one instrument stand 242, is easier to handle, and is easier to align. In one embodiment, the shaft 244 of the scale-bar 240 is similar in cross-section and material to that in the FIG. 1 embodiment but has a shorter length. In another embodiment, the exemplary scale-bar shaft 244 is about 1 meter. The illustrated exemplary scale-bar artifact 240 additionally includes magnetic target nests 246 positioned along the scale-bar shaft 244. In another embodiment, the magnetic target nests 246 are glued in a straight line on one side of the shaft 244. A digital data line 276 is shown connecting a computer 278 or other similar device to the scale-bar artifact 240. Additionally, a power line 280 is shown connected to the scale-bar artifact 240. Additionally, an air temperature sensor is illustrated on the scale-bar artifact at 282.

A fixed magnetic mounting nest 248 similar to those illustrated by the exemplary embodiment of FIG. 5 may be glued or otherwise attached to an opposite side of the scale-bar shaft 244. The fixed magnetic mounting nest 248 is generally configured to attach to a sphere 252, e.g., in one embodiment a ferromagnetic sphere, of a mount, which in one embodiment is a 1D (one-dimensional) adjustable mount, shown generally at 250. The exemplary 1D adjustable mount may be screwed or otherwise affixed to the thin ferromagnetic plate 272 that in turn is screwed or affixed to an instrument stand adapter 274, which may be an aluminum material, among others.

Referring to FIG. 27, an exemplary 1D adjustable spherical mount, shown generally at 250, is illustrated in proximity to a fixed magnetic mounting nest, shown generally at 248. The exemplary 1D adjustable mount 250 comprises a linear bearing 254, linear-bearing adapter plate 256, a cylinder 258 and ferromagnetic sphere 252. A material configured to engage the material of optional magnetic mounting nest straps (32 in FIG. 4), e.g., a Velcro material, may also be applied to the cylinder surface 260.

The exemplary embodiment described by FIG. 26 additionally includes a second fixed magnetic mounting nest attached to a ferromagnetic sphere 264 of another mount, which in another embodiment is a 2D (two-dimensional) adjustable mount, shown generally at 262.

Referring to FIG. 28, an exemplary 2D adjustable spherical mount, shown generally at 262, is illustrated in proximity to a fixed magnetic mounting nest, shown generally at 248. The exemplary 2D adjustable mount comprises a magnetic base 266 with on/off switch 268, magnetic-base adapter plate 270, and ferromagnetic sphere 264. When the magnet on/off switch 268 is in the on position, the bottom of the magnetic base 266 holds firmly to the ferromagnetic plate illustrated at 272 in FIG. 26. When the magnet switch 268 is in the off position, the magnetic base 266 is not held in place and can be freely moved on the surface of the ferromagnetic plate 272. A material configured to engage the material of optional magnetic mounting nest straps (32 in FIG. 4), e.g., a Velcro material, may also be applied to the magnetic base 266.

Alignment Procedures

Figure 29:
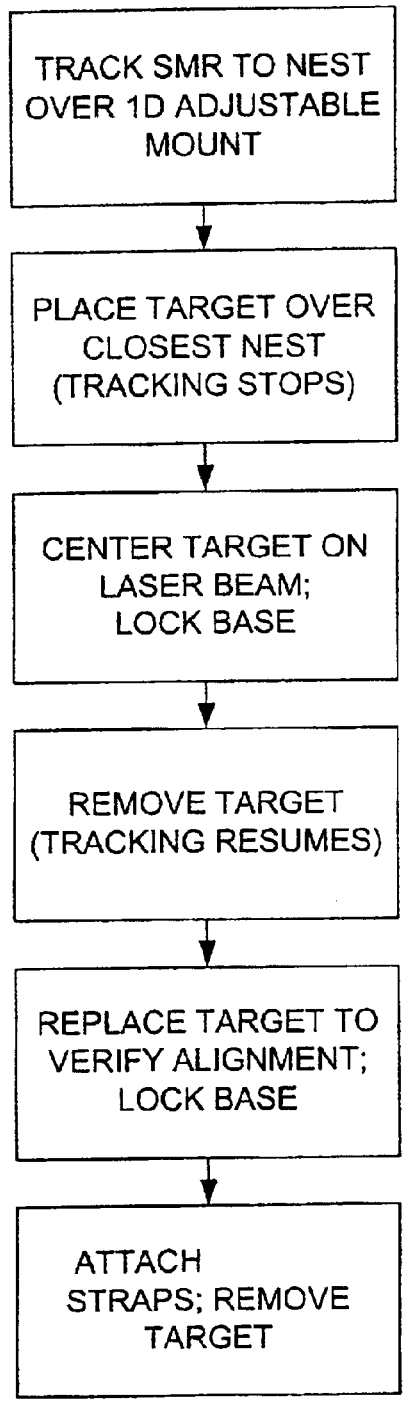
FIG. 29 lists exemplary steps in aligning the scale-bar of the second embodiment to the laser beam from the laser tracker.
Figure 30:
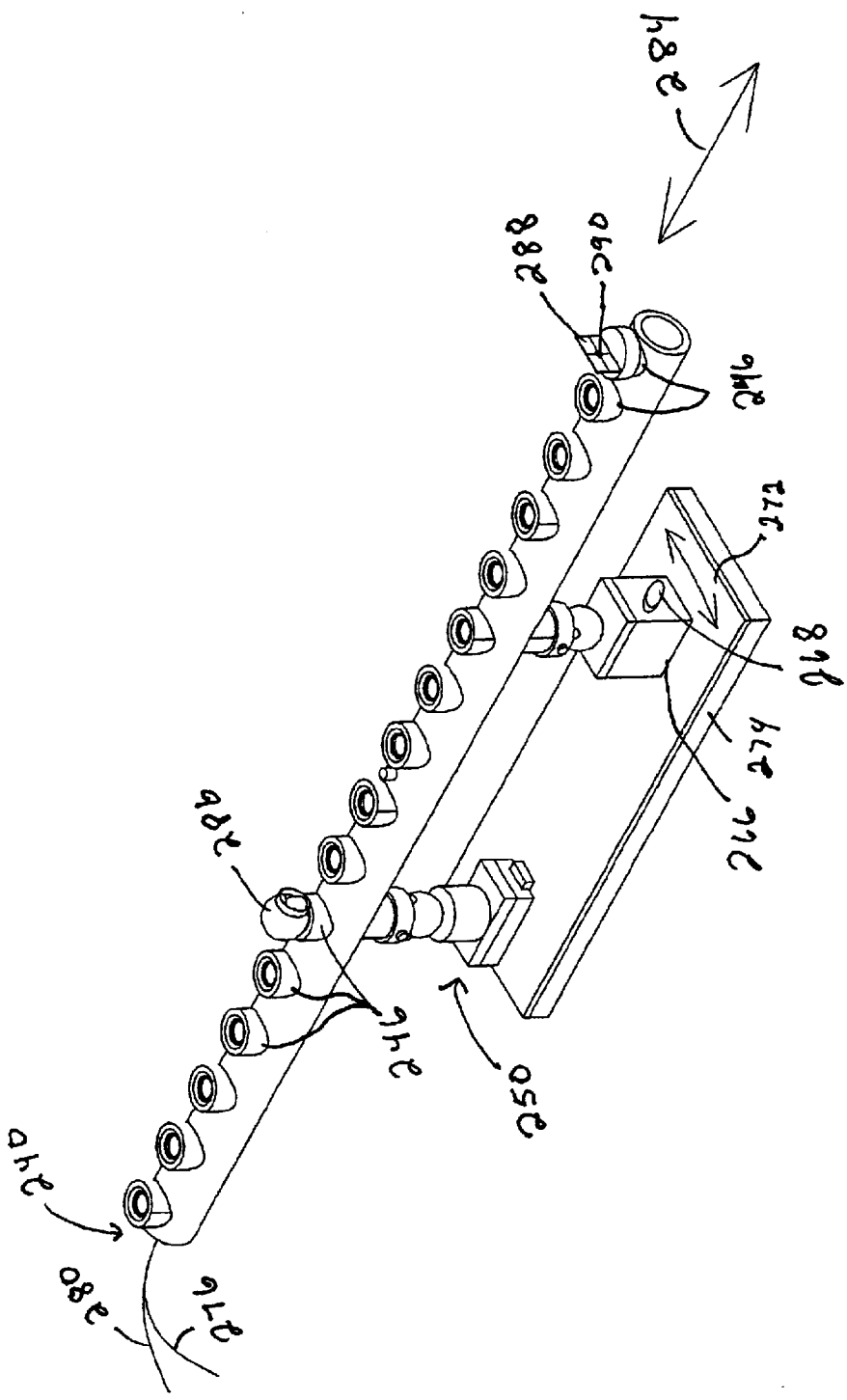
FIG. 30 depicts in perspective view an exemplary plate-mounted scale-bar.

The scale-bar 240 may be aligned with a laser beam 284, e.g., from a tracker, to perform performance verification or compensation. With reference to the flowchart of FIG. 29, this alignment may easily be performed. The tracking function of a tracker device may be activated and a laser beam 284 may be sent to an SMR 286 positioned on the magnetic target nest 246 above the 1D adjustable mount 250 (position illustrated by FIG. 30). This magnetic target nest 246 may be referred to as the pivot nest. The laser beam 284 from the tracker may remain centered on the SMR 286. Additionally, an object 288 may be placed between the laser tracker and the pivot nest 246 so that light does not re-enter the tracker, thereby freezing the direction of the laser beam 284. In one exemplary embodiment, the object 288 is the hand of the operator, or in another exemplary embodiment, the object is some other object, e.g., a crosshair target similar to that of previous embodiments. The object 288 may be positioned at the magnetic target nest 246 that is closest to the tracker.

The on/off switch 268 of the magnetic base 266 may be turned to the off position, thereby allowing the magnetic base 266 to be freely moved on the ferromagnetic plate 272. The magnetic base may be moved side to side as desired. The instrument stand adapter 274 may similarly be raised or lowered as desired to center the laser beam 284 on the object 288. In an embodiment wherein the object 288 is a crosshair target, the magnetic base 266 and the instrument stand adapter 272 may be adjusted to center the laser beam 284 on the target crosshairs 290 of the crosshair target 288. The on/off switch 268 of the magnetic base 266 may be moved to the on position to lock the magnetic base 266 to the ferromagnetic plate 272. The object 288 may be removed from the magnetic target nest 246, causing the laser beam 284 to once again intercept the SMR 286 (tracking resumes). Verification of position may be performed by replace the object 288 on the magnetic target nest 246 closest to the tracker and ensuring that the laser beam 284 is still centered on the object 288. In most cases, the laser beam 284 will have remained centered because the SMR 286 is located directly above the 1D adjustable spherical mount 250.

However, if the magnetic base 266 has been moved in a radial direction, either in or out, then the pivot point may have changed slightly. In this case, the magnetic base may be adjusted as needed as described above.

Figure 31:
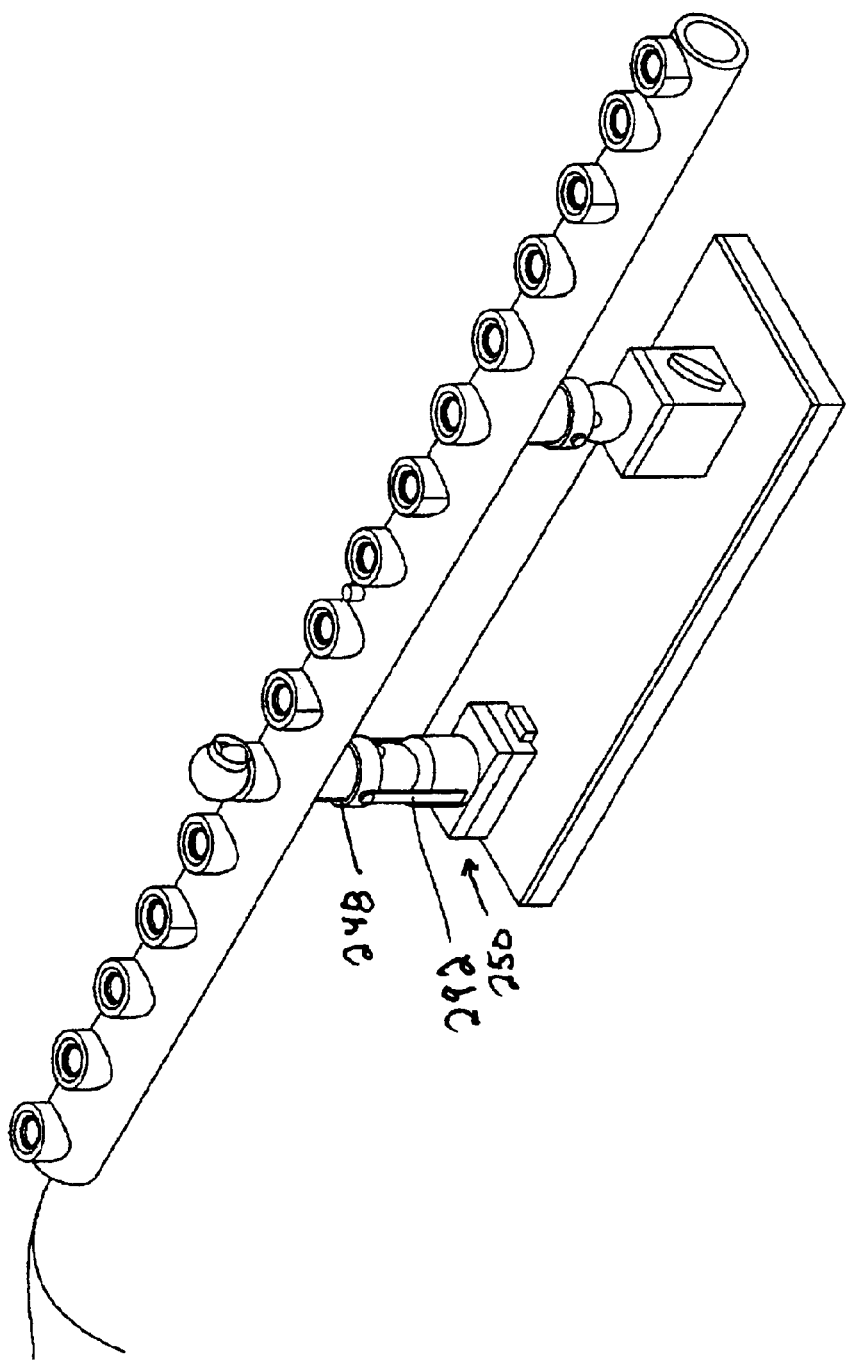
FIG. 31 depicts in perspective view an exemplary plate-mounted scale-bar.

Referring to FIG. 31, the scale-bar may optionally be secured against undesired rotation by attachment of straps 292 between the fixed magnetic mounting nest 248 and the 1D adjustable spherical mount 250.

Performance Verification and Compensation

After the last step above, the scale-bar 240 is aligned with the laser beam 284, and the SMR 286 can be moved from nest to nest 246 on the scale-bar 240 to verify performance or to determine compensation parameters. This is done by comparing the readings of the distance meter to the reference distances between the nests 246. As described above, in exemplary determinative processes, the reference distances between the nests can be determined: (1) from data sent over the digital data line 276 from the scale-bar 240 to a computing device 278; or (2) from a measurement performed with a reference interferometer in a laser tracker or similar device. The first exemplary method is sufficiently described above. The second exemplary method is also similar to that of the second method described above. In one exemplary embodiment, the small scale-bar of the exemplary embodiment illustrated by FIG. 26 may generally be kept in a horizontal position, thereby eliminating any potential need of a spherically mounted mirror (SMM) to reflect the laser beam in the appropriate direction. In such a configuration, the scale-bar 240 may be adjusted in the direction of the laser beam 284 from a reference interferometer using a procedure similar to the one given described above, including manipulation of a magnetic base 266 and positioning of an instrument stand adapter 274.

The performance of a distance meter may be checked by moving the scale-bar 240 to a variety of distances, in one embodiment, spread between the minimum and maximum ranges of the distance meter. If desired, a comprehensive check of the performance of the distance meter can be obtained by abutting concatenated distance segments so that the distance at the end of a segment is approximately the same as the distance at the start of the next segment. Fine adjustments in distance are easily obtained in the abutting procedure by moving the magnetic base 266 in or out (in the radial direction) while the laser beam 284 from the laser tracker is locked onto an SMR 286 located in the pivot nest 246 and while data from the distance meter (phase, distance, or similar quantity) is displayed in real time.

If the scale-bar 240 is used to determine the compensation parameters for a distance meter having cyclic errors, then the spacing between the magnetic target nests 246 may be separated by appropriate distances, as discussed previously.

It will be apparent to those skilled in the art that, while exemplary embodiments have been shown and described, various modifications and variations can be made in the scale-bar of the present invention without departing from the spirit or scope of the invention. Accordingly, it is to be understood that the various embodiments have been described by way of illustration and not limitation.

What is claimed is:

1. A scale-bar artifact, comprising:
   a shaft;
   at least one mounting nest positioned on the shaft;
   a plurality of target nests positioned on the shaft;
   at least one temperature sensor in contact with the material of the shaft; and
   a computer or circuit board in communication with the at least one temperature sensor, wherein the computer or circuit board is configured to receive temperature sensor data and to compile temperature corrected distance measurements corresponding to at least one linear portion of the shaft.

2. The scale-bar artifact of claim 1, wherein at least one of temperature sensor is a thermistor placed in series with a voltage reference and a known resistance.

3. The scale-bar artifact of claim 1, wherein at least one temperature sensor is provided within a small hole in the shaft.

4. The scale-bar artifact of claim 3, wherein the at least one temperature sensor is encapsulated in epoxy.

5. The scale-bar artifact of claim 1, wherein a plurality of temperature sensors are spaced in about even distances along the shaft.

6. The scale-bar artifact of claim 1, wherein the at least one temperature sensor is connected to a circuit board having an output.

7. The scale-bar artifact of claim 6, wherein the circuit board comprises one or more of a voltage regulator, a nonvolatile memory, a digital-signal processing module and a communication transceiver.

8. The scale-bar artifact of claim 6, wherein the output is configured to communicate with a separate computer, interferometer or coordinate measuring device, and wherein the sensor output relays at least one temperature value for at least one sensor position along the shaft, or wherein the output relays temperature corrected distance measurements corresponding to at least one linear portion of the shaft.

9. The scale-bar artifact of claim 1, wherein the at least one temperature sensor is embedded within the material of the scale-bar shaft.

10. The scale-bar artifact of claim 1, wherein the one or more of the shaft, at least one mounting nest and plurality of target nests comprise an aluminum material.

11. The scale-bar artifact of claim 1, wherein at least two target nests are spaced at a known interval as a function of temperature.

12. The scale-bar artifact of claim 1, wherein the scale-bar artifact comprises a plurality of mounting nests positioned on the shaft.

13. The scale-bar artifact of claim 1, wherein the plurality of target nests are configured to receive one or more of a spherically mounted mirror, a crosshair target, a spherically mounted retroreflector and a beamsplitter.

14. The scale-bar artifact of claim 1, wherein the plurality of target nests are magnetic target nests.

15. The scale-bar artifact of claim 1, wherein the at least one mounting nest comprises at least one fixed kinematic mounting nest configured to receive a separate mounting component.

16. The scale-bar artifact of claim 15, wherein the at least one fixed kinematic mounting nest further comprises a mechanical attachment mechanism attached thereto, the mechanical attachment mechanism configured to engage a portion of a separate component.

17. The scale-bar artifact of claim 16, wherein the mechanical attachment is detachably attached to the at least one fixed kinematic mounting nest.

18. The scale-bar artifact of claim 16, wherein the mechanical attachment is at least one strap configured to attach or otherwise adhere to a body of a separate mounting component.

19. The scale-bar artifact of claim 15, wherein the separate mounting component comprises a one dimensional adjustable mount having a spherical mounting surface.

20. The scale-bar artifact of claim 15, wherein the separate mounting component comprises a two dimensional adjustable mount having a spherical mounting surface.

21. The scale-bar artifact of claim 20, wherein the spherical mounting surface is a ferromagnetic mounting surface.

22. The scale-bar artifact of claim 20, wherein the two dimensional adjustable mount further comprises a selectively magnetic base and a switch, wherein the switch enables or disables the magnetism of the base.

23. The scale-bar artifact of claim 15, wherein the at least one fixed kinematic mounting nest comprises a body supporting a plurality of kinematic spheres configured to receive a spherical surface of a separate mounting component.

24. The scale-bar artifact of claim 23, wherein the plurality of kinematic spheres prohibit contact of the spherical surface with the body of the at least one fixed kinematic mounting nest.

25. The scale-bar artifact of claim 23, wherein the kinematic spheres comprise a thermally insulating material.

26. The scale-bar artifact of claim 25, wherein the kinematic spheres comprise a ceramic material.

27. The scale-bar artifact of claim 23, wherein the at least one fixed kinematic mounting nest further comprises a magnetic component, and wherein the spherical surface of the separate mounting component comprises a ferromagnetic material.

28. The scale-bar artifact of claim 23, wherein the at least one fixed kinematic mounting nest comprises a body supporting three kinematic spheres configured to receive a spherical surface of a separate mounting component.

29. The scale-bar artifact of claim 1, wherein the mounting nests comprise at least one adjustable kinematic mounting nest configured to receive a separate mounting component.

30. The scale-bar artifact of claim 29, wherein the at least one adjustable kinematic mounting nest is configured to adjust along a line.

31. The scale-bar artifact of claim 30, wherein the at least one adjustable kinematic mounting nest is configured to adjust along a line from a central position to about 12 to about 25 millimeters in either direction along the line.

32. The scale-bar artifact of claim 30, wherein the at least one adjustable kinematic mounting nest is configured to slide along a linear track or base.

33. The scale-bar artifact of claim 29, wherein the at least one adjustable kinematic mounting nest comprises a body supporting a plurality of kinematic spheres configured to receive a spherical surface of a separate mounting component.

34. The scale-bar artifact of claim 33, wherein the plurality of kinematic spheres prohibit contact between the spherical surface of the separate mounting component and the body of the adjustable kinematic mounting nest.

35. The scale-bar artifact of claim 33, wherein the kinematic spheres comprise a thermally insulating material.

36. The scale-bar artifact of claim 35, wherein the kinematic spheres comprise a ceramic material.

37. The scale-bar artifact of claim 33, wherein the separate mounting component comprises a spherical surface supported by a body provided on an adjustable clamp, and wherein the adjustable clamp is configured to attach to a rigid structure.

38. The scale-bar artifact of claim 33, wherein the at least one adjustable kinematic mounting nest further comprises a magnetic component, and wherein the spherical surface of the separate mounting component comprises a ferromagnetic material.

39. The scale-bar artifact of claim 29, wherein the at least one adjustable kinematic mounting nest comprises a body supporting three kinematic spheres configured to receive a spherical surface of a separate mounting component.

40. The scale-bar artifact of claim 1 further comprising at least one separate mounting component, wherein the at least one separate mounting component is provided on a rigid structure and comprises at least one spherical mounting surface configured to engage at least one of the mounting nests.

41. The scale-bar artifact of claim 40, wherein the rigid structure is an instrument stand, and wherein the instrument stand has at least one vertically adjustable component.

42. The scale-bar artifact of claim 40, further comprising a reference interferometer attached to the rigid structure.

43. The scale-bar artifact of claim 1, further comprising an air temperature sensor positioned on the shaft.

44. A scale-bar artifact, comprising:
a shaft;
a plurality of target nests spaced along the shaft; and
at least one mounting nest provided on the shaft, wherein at least one mounting nest comprises at least one fixed kinematic mounting nest configured to receive a separate mounting component, wherein the at least one fixed kinematic mounting nest further comprises a mechanical attachment mechanism attached thereto configured to engage a portion of the separate component, wherein the mechanical attachment is at least one strap configured to attach or otherwise adhere to a body of separate mounting component.

45. A scale-bar artifact, comprising:
a shaft;
a plurality of target nests spaced along the shaft; and
at least one mounting nest provided on the shaft, wherein at least one mounting nest comprises at least one fixed kinematic mounting nest configured to receive a separate mounting component, wherein the separate mounting component comprises a one dimensional adjustable mount having a spherical mounting surface.

46. A scale-bar artifact, comprising:
a shaft;
a plurality of target nests spaced along the shaft; and
at least one mounting nest positioned on the shaft, wherein at least one mounting nest comprises at least one fixed kinematic mounting nest configured to receive a separate mounting component, wherein the separate mounting component comprises a two dimensional adjustable mount having a spherical mounting surface.

47. The scale-bar artifact of claim 46, wherein the spherical mounting surface is a ferromagnetic surface.

48. The scale-bar artifact of claim 46, wherein the two dimensional adjustable mount further comprises a selectively magnetic base and switch, wherein the switch enables or disables the magnetism of the base.

49. A scale-bar artifact, comprising:
   a shaft;
   a plurality of target nests spaced along the shaft; and
   at least one mounting nest positioned on the shaft, wherein at least one mounting nest comprises at least one fixed kinematic mounting nest configured to receive a separate mounting component, wherein the at least one fixed kinematic mounting nest comprises a body supporting a plurality of kinematic spheres configured to receive a spherical surface of a separate mounting component.

50. The scale-bar artifact of claim 49, wherein the plurality of kinematic spheres prohibit contact of the spherical surface with the body of the at least one fixed kinematic mounting nest.

51. The scale-bar artifact of claim 49, wherein the kinematic spheres comprise a thermally insulating material.

52. The scale-bar artifact of claim 51, wherein the kinematic spheres comprise a ceramic material.

53. The scale-bar artifact of claim 49, wherein the at least one fixed kinematic mounting nest further comprises a magnetic component, and wherein the spherical surface of the separate mounting component comprises a ferromagnetic material.

54. The scale-bar artifact of claim 49, wherein the at least one fixed kinematic mounting nest comprises a body supporting three kinematic spheres configured to receive a spherical surface of a separate mounting component.

55. A scale-bar artifact, comprising:
   a shaft; and
   a plurality of target nests positioned on the shaft; and
   at least one mounting nest positioned on the shaft, wherein at least one mounting nest comprises at least one adjustable kinematic mounting nest configured to receive a separate mounting component, wherein the at least one adjustable kinematic mounting nest comprises a body supporting a plurality of kinematic spheres configured to receive a spherical surface of a separate mounting component.

56. The scale-bar artifact of claim 55, wherein the plurality of kinematic spheres prohibit contact between the spherical surface of the separate mounting component and the body of the adjustable kinematic mounting nest.

57. The scale-bar artifact of claim 55, wherein the kinematic spheres comprise a thermally insulating material.

58. The scale-bar artifact of claim 57, wherein the kinematic spheres comprise a ceramic material.

59. The scale-bar artifact of claim 55, wherein the separate mounting component comprises a spherical surface supported by a body provided on an adjustable clamp, and wherein the adjustable clamp configured to attach to a rigid structure.

60. The scale-bar artifact of claim 55, wherein the at least one adjustable kinematic mounting nest further comprises a magnetic component, and wherein the spherical surface of the separate mounting component comprises a ferromagnetic material.

61. A scale-bar artifact, comprising:
   a shaft; and
   a plurality of target nests positioned on the shaft; and
   at least one mounting nest positioned on the shaft, wherein at least one mounting nest comprises at least one adjustable kinematic mounting nest configured to receive a separate mounting component, wherein the at least one adjustable kinematic mounting nest comprises a body supporting three kinematic spheres configured to receive a spherical surface of separate mounting component.

62. A scale-bar artifact, comprising:
   a shaft; and
   a plurality of target nests positioned on the shaft; and
   at least one mounting nest positioned on the shaft, wherein at least one mounting nest comprises at least one adjustable kinematic mounting nest configured to receive a separate mounting component, further comprising at least one separate mounting component, wherein the at least one separate mounting component is provided on a rigid structure and comprises at least one spherical mounting surface configured to engage at least one of the mounting nests.

63. The scale-bar artifact of claim 62, wherein the rigid structure is an instrument stand, and wherein the instrument stand has at least one vertically adjustable component.

64. A method for accurately measuring scale-bar length with a tracker interferometer, comprising:
   tracking a spherically mounted retroreflector to a target nest on a scale-bar artifact with a tracker interferometer;
   with tracking disengaged, replacing the spherically mounted retroreflector with a spherically mounted mirror;
   adjusting the spherically mounted mirror such that a reflected laser beam targets a reference object on a second scale-bar artifact target nest;
   positioning a spherically mounted retroreflector on a third scale-bar artifact target nest positioned between the first and third scale-bar artifact target nests; and
   while maintaining the position of the spherically mounted mirror, measuring the distances between the third and at least one additional scale-bar artifact target nest with the tracker interferometer.

65. A method for measuring temperature compensation values of a scale-bar, comprising:
   aligning a laser beam of a laser tracker having a tracking interferometer such that the laser beam intersects a spherically mounted retroreflector positioned on a first target nest of a scale-bar artifact;
   measuring the distance between the first target nest of the scale-bar artifacts and at least one additional target nest of the scale-bar artifact using the tracking interferometer;
   aligning a reference interferometer such that a laser beam passes from the reference interferometer through a beam-splitter and retroreflector assembly, positioned in a target nest of the scale-bar artifact, to a spherically mounted retroreflector, positioned in a target nest of the scale-bar artifact, and such that the laser beam is reflected back to the reference interferometer; and
   increasing the temperature of the scale-bar artifact while monitoring changes in scale-bar length.

66. The method in accordance with claim 65, further comprising reading the temperature of the scale-bar artifact with an air-temperature sensor.

67. The method in accordance with claim 65, further comprising monitoring the temperature of the scale-bar using at least one temperature sensor in contact with the material of the scale-bar and provided on scale-bar.

* * * * *